(12) United States Patent
Feldhake

(10) Patent No.: US 7,577,631 B2
(45) Date of Patent: Aug. 18, 2009

(54) COGNITIVE IMAGE FILTERING

(76) Inventor: Michael J. Feldhake, 209 Dartmouth Dr., O'Fallon, IL (US) 62269

( * ) Notice: Subject to any disclaimer, the term of this patent is extended or adjusted under 35 U.S.C. 154(b) by 398 days.

(21) Appl. No.: 10/103,422

(22) Filed: Mar. 21, 2002

(65) Prior Publication Data
US 2003/0049589 A1 Mar. 13, 2003

Related U.S. Application Data

(60) Provisional application No. 60/318,464, filed on Sep. 10, 2001.

(51) Int. Cl.
G06N 5/02 (2006.01)

(52) U.S. Cl. .................. 706/46; 717/104; 600/410

(58) Field of Classification Search ........... 706/25, 706/26, 46, 45; 600/544; 382/207
See application file for complete search history.

(56) References Cited

U.S. PATENT DOCUMENTS

| | | | |
|---|---|---|---|
| 4,697,242 A | 9/1987 | Holland et al. | |
| 4,906,865 A | 3/1990 | Holler | |
| 4,914,708 A * | 4/1990 | Carpenter et al. | 382/156 |
| 4,926,064 A * | 5/1990 | Tapang | 706/26 |
| 4,989,256 A | 1/1991 | Buckley | |
| 5,010,512 A | 4/1991 | Hartstein et al. | |
| 5,040,214 A * | 8/1991 | Grossberg et al. | 704/240 |
| 5,153,923 A * | 10/1992 | Matsuba et al. | 382/158 |
| 5,157,738 A | 10/1992 | Carpenter et al. | |
| 5,179,596 A | 1/1993 | Weingard | |
| 5,212,821 A | 5/1993 | Gorin et al. | |
| 5,214,715 A | 5/1993 | Carpenter et al. | |
| 5,253,329 A * | 10/1993 | Villarreal et al. | 706/31 |
| 5,295,197 A | 3/1994 | Takenaga et al. | |
| 5,418,886 A | 5/1995 | Oita et al. | |
| 5,420,964 A | 5/1995 | Sugasaka et al. | |
| 5,444,796 A | 8/1995 | Ornstein | |
| 5,479,569 A | 12/1995 | Kyuma et al. | |
| 5,493,688 A | 2/1996 | Weingard | |
| 5,515,477 A | 5/1996 | Sutherland | |
| 5,524,177 A | 6/1996 | Suzuoka | |
| 5,566,273 A | 10/1996 | Huang et al. | |

(Continued)

OTHER PUBLICATIONS

Marurana and Varela, The Tree of Knowledge- Biological Roots of Human Understanding, Shambhala, 1992, p. 164, 169.*

(Continued)

*Primary Examiner*—David R Vincent
*Assistant Examiner*—Kalpana Bharadwaj
(74) *Attorney, Agent, or Firm*—Armstrong Teasdale LLP

(57) ABSTRACT

An operating system configured to support cognitive capable environments is described. The system comprises a memory structure and an I/O process configured to update inputs and outputs. The operating system further includes a process to determine changes to symbols within the symbol space due to the stimulus and create STM images of the inputs. Additional processes are configured to pass stimulations between connecting symbols, measure temporal and spatial properties of images, filter the STM images based upon the properties, and propagate stimuli through hereditary structures. Further processes analyze propagated symbol groups of STM images for novel distinctions, create new symbols, connect novel stimuli together for symbol groupings, update existing symbols to include connections to the new symbols, and assign weights to the connections. Additional processes form stimulus-response pairs from received images, provide time-based erosion of connection weights of symbols and adapt learned responses to long term memories.

17 Claims, 22 Drawing Sheets

U.S. PATENT DOCUMENTS

| | | | |
|---|---|---|---|
| 5,586,218 A | | 12/1996 | Allen |
| 5,586,222 A | | 12/1996 | Zhang et al. |
| 5,590,218 A | | 12/1996 | Ornstein |
| 5,598,510 A | | 1/1997 | Castelaz |
| 5,719,966 A | * | 2/1998 | Brill et al. ................. 382/260 |
| 5,745,895 A | | 4/1998 | Bingham et al. |
| 5,774,632 A | | 6/1998 | Kaske |
| 5,812,992 A | | 9/1998 | De Vries |
| 5,835,901 A | * | 11/1998 | Duvoisin et al. ............. 706/19 |
| 5,835,902 A | | 11/1998 | Jannarone |
| 5,841,895 A | | 11/1998 | Huffman |
| 5,920,852 A | * | 7/1999 | Graupe ...................... 706/26 |
| 5,937,432 A | | 8/1999 | Yamaguchi et al. |
| 5,946,673 A | | 8/1999 | Francone et al. |
| 6,029,099 A | | 2/2000 | Brown |
| 6,031,537 A | * | 2/2000 | Hugh ......................... 715/854 |
| 6,058,206 A | | 5/2000 | Kortge |
| 6,125,339 A | | 9/2000 | Reiser et al. |
| 6,166,739 A | | 12/2000 | Hugh |
| 6,169,981 B1 | | 1/2001 | Werbos |
| 6,185,554 B1 | | 2/2001 | Bennett |
| 6,847,737 B1 | * | 1/2005 | Kouri et al. ................ 382/260 |
| 2003/0149678 A1 | * | 8/2003 | Cook ......................... 706/46 |

OTHER PUBLICATIONS

Alfred Tarski, Introduction to Logic and to the Methodology of Deductive Sciences, Dover, 1995, p. 117-140.*

S. Grossberg, "Linking Mind to Brain: The Mathematics of Biological Intelligence", Notices of the AMS 1361, Dec. 2000.*

File://E:\Global %20Workspace%20Theory.htm; Bernard J. Baars and Katherine McGovern; "Global Workspace A Theory of Consciousness"; revised Nov. 5, 1997; The Wright Institute, Berkeley, California; 2 pages; Jun. 15, 2000.

File://E\Researchers%20Trace%20Roots%20Vivid%20Memories. htm; "Researchers Trace Roots of Vivid Memories"; ® 2000 Howard Hughes Medical Institute; 2 pages; Jun. 15, 2001.

Josh McDermott, "Global Workspace Theory: Consciousness Explained?" *Harvard Undergraduate Society For Neuroscience*, Copyright ® 1995.

Hyacinth S. Nwana and Divine T. Ndumu, "A Perspective on Software Agents Research"; Abstract; *Applied Research & Technology Department*, British Telecommunications Laboratories; 16 pages.

File://E:\ASoftwareAgentModel.htm; Stan Franklin and Art Graesser, "A Software Agent Model of Consciousness", Abstract; *Conscious Software Research Group Institute for Intelligent Systems;* The University of Memphis; 17 pages; Jun. 15, 2001.

Myles Brandon Bogner, "Realizing 'Consciousness' In Software Agents"; A Dissertation for The University of Memphis; 145 pages; Dec. 1999.

* cited by examiner

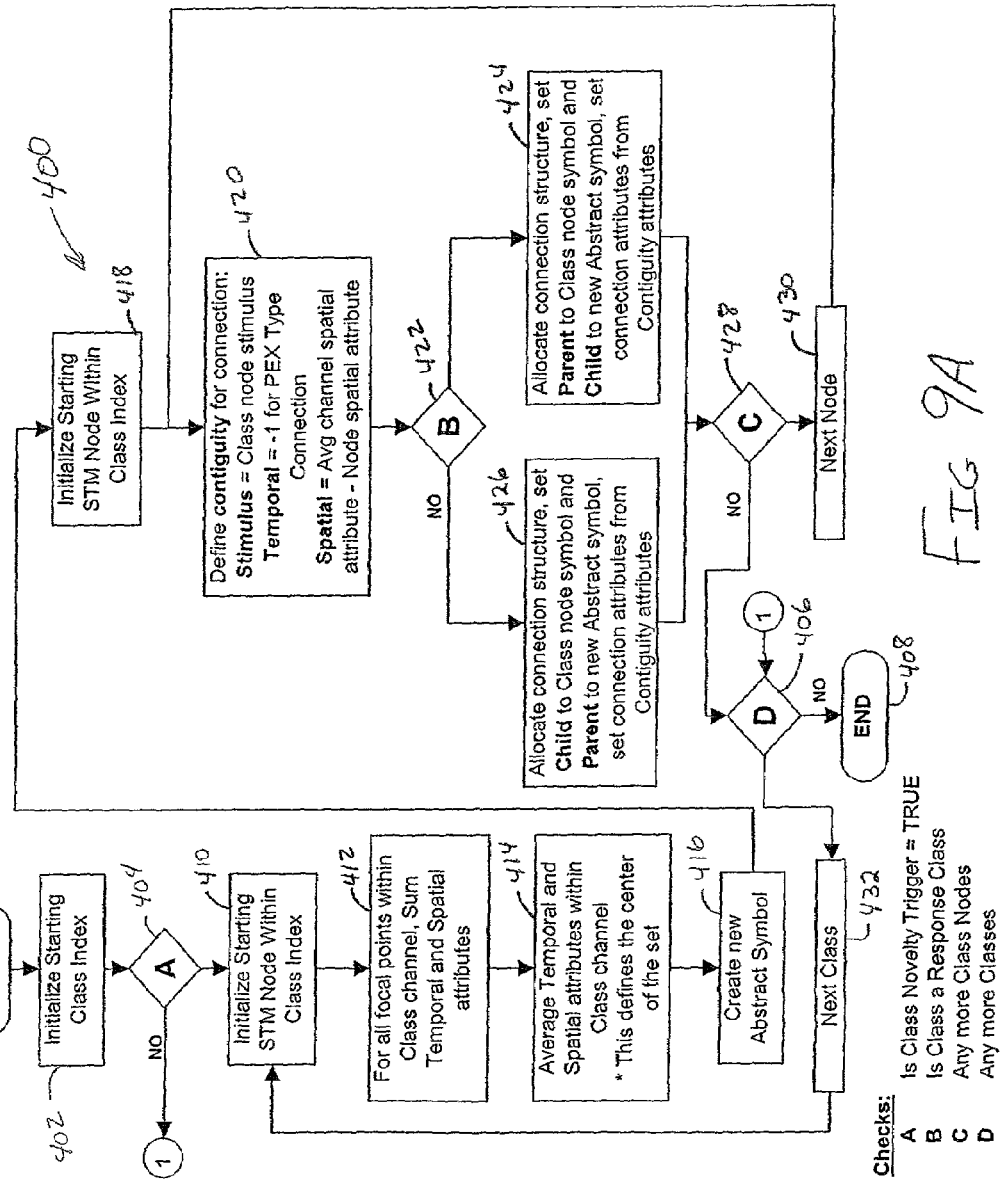

| TYPE | NAME | FUNCTION |
|---|---|---|
| char | sym[MAX_UAC_LENGTH]; | //UAC of focal Symbol |
| AMSYMS | *symbol; | //Addr: Location of Symbol |
| int | class_mem; | //Classification Group |
| SOCS | *SOCS_ref; | //Keep for Adaptation |
| int | Pin_Sw; | //ON = Memory image |
| float | stimulus; | //Storage Data |
| int | focus_pt; | // focus point; TRUE/FALSE |
| int | Fp_item; | // Focal item; TRUE/FALSE |
| float | error; | // Deviation last iteration |
| float | fitness; | Fitness value |
| float | polarity; | // Cntrl Domain Polarity |
| float | dev_start; | For polarity setting |
| float | ramp_down; | For polarity reset |
| float | temporal; | Time reference |
| float | s_tb; | Spatial Top/Bottom |
| float | s_lr; | Spatial Left/Right |
| float | s_fb; | Spatial Front/Back |
| int | Duration; | //Length in Focus |
| int | Ignore_Shift; | //Adapted last Iteration… |
| int | last_use; | //Image last used in STM |
| int | type_cn; | |
| SPAS | *last; | //Pointer to last node |
| SPAS | *next; | //Pointer to the next node in class |

FIG 16

| TYPE | NAME | FUNCTION |
|---|---|---|
| char | uac[MAX_UAC_LENGTH]; | //Symbol unique alphanumeric code (UAC) |
| int | member; | //Symbol class membership |
| int | sub_member; | //Symbol subclass membership |
| SOCS | *out_con_o; | //Symbol parent Order connect struct |
| SOCS | *out_con_last; | //Last Out Connect |
| SSPS | *carrier_cn; | //Carrier symbol for cn |
| float | Pin_stim_cn; | |
| float | Pin_excite; | //Symbol accumlative Pin excitation |
| float | Pex_stim_ns; | //Symbol accumlative Pex stimulation |
| float | Pex_stim_cn; | |
| float | Pex_stim_ps; | |
| float | Pex_excite; | //Symbol accumlative Pex excitation |
| float | Pex_fb_pos; | //Spatial Positions |
| float | Pex_lr_pos; | // |
| float | Pex_tb_pos; | // |
| float | Pex_store; | //Symbol excitation last iteration |
| float | Pex_tm_sav; | // |
| float | Pex_fb_sav; | // |
| float | Pex_lr_sav; | // |
| float | Pex_tb_sav; | // |
| int | Pex_s_count; | //Spatial images count |
| int | Ignore_Shift; | //Ignore Transitional Shift - Adapted |
| float | deviation; | //Domain deviation |
| float | polarity; | //Domain polarity |
| float | change; | //Adaptation rate of change |
| int | Conscious; | //Symbol Conscious control |
| long | duration; | //Symbol Conscious timer |
| long | dur_cn_it; | //Last iteration of chk of duration |

| TYPE | NAME | FUNCTION |
|---|---|---|
| char | Pin_oconn[MAX_UAC_LENGTH]; | //UAC of Pin in connect Symbol |
| float | Pin_weight; | //Pin weight of connection |
| float | Pin_latency; | Time latency |
| float | Pin_s_tb; | Spatial Top/Bottom |
| float | Pin_s_lr; | Spatial Left/Right |
| float | Pin_s_fb; | Spatial Front/Back |
| char | Pex_oconn[MAX_UAC_LENGTH]; | //UAC of Pex in connect Symbol |
| float | Pex_weight; | //Pex weight of connection |
| float | Pex_latency; | Time latency |
| float | Pex_s_tb; | Spatial Top/Bottom |
| float | Pex_s_lr; | Spatial Left/Right |
| float | Pex_s_fb; | Spatial Front/Back |
| AMSYMS | *Sym_Reference; | // AMSYMS ref of connection |
| int | Pin_Update_Trig; | // Pin Update Required |
| float | Residual; | //Retained Firing Signal |
| float | T_error; | //Pin - Pex Temporal error |
| float | Stb_error; | Spatial Top/Bottom |
| float | Slr_error; | Spatial Left/Right |
| float | Sfb_error; | Spatial Front/Back |
| SOCS | *out_con_next; | //Pointer to the next parent node |

| Acronym | Meaning |
|---|---|
| bounds | Used in the filtering processes, bounds set the limits of the temporal & spatial zones |
| fb | Front to Back Axis in a 3D positioning coordinate system |
| lr | Left to Right Axis in a 3D positioning coordinate system |
| LTM | Long Term Memory |
| Pex | Experience or reality domain |
| Pin | Introspective or perception domain |
| Pt | Point |
| S | Spatial |
| SPAS | Symbolic Perspective Image Structure (STM Image) |
| SOCS | Symbolic Output Connection Structure |
| STM | Short Term Memory |
| Sw | Switch |
| T | Temporal |
| tb | Top to Bottom Axis in a 3D positioning coordinate system |
| UAC | Unique Alphanumeric Code |

COGNITIVE IMAGE FILTERING

CROSS REFERENCE TO RELATED APPLICATIONS

This application claims the benefit of U.S. Provisional Application No. 60/318,464, filed Sep. 10, 2001, which is hereby incorporated by reference in its entirety.

BACKGROUND OF THE INVENTION

This invention relates generally to software operating systems, and, more particularly to a system which provides a cognitive capable environment.

People have always attempted to define human consciousness. Most attempts since the beginning of the computer age have been trivial since those attempts have tried to define consciousness within a small set of rules. The small rule set has typically been imposed since we cannot yet fully comprehend how our minds work. Science has provided many theories, facts, and ideas regarding human consciousness, both of minor and major importance to humanity.

Although some known approaches may actually realize some "Intelligent Behavior", the behavior is only simulated and limited. The known approaches are limited in that behavior due to the limits placed on them by the media used to develop the processes.

Current software models use underlining languages to build sequentially processed programs to attempt to duplicate the higher brain functions of human intelligence. Unfortunately, these sequentially processed programs immediately assume that all minds think alike and that the process is fixed given the same input stimulus or environment (i.e. all have the same behavior). However, the process of thought is an individual experience and cannot be duplicated by someone else or even by a single individual. Creativity and self-expression is founded in our innate ability to think differently. Once this individuality has been accepted, one can be open to new and undiscovered techniques to attempt to define core processes for cognition.

BRIEF DESCRIPTION OF THE INVENTION

In one aspect, there is provided, an operating system configured to support cognitive capable environments. The operating system comprises a memory structure, including a symbol allocation table, a symbol space, and a short term memory (STM) image space, at least one input/output process configured to update inputs and outputs, and at least one short term memory load process configured to determine changes to symbols within the symbol space due to the stimulus and create STM images of the inputs. Further processes within the operating system comprise at least one symbolic associative stimulation process configured to propagate stimulations between connecting symbols within the symbol space, at least one focus process configured to measure temporal and spatial properties of STM images and filter the STM images based upon the properties, and at least one process configured for propagation of stimuli through hereditary structures. Further, at least one process configured to analyze propagated symbol groups of STM images for novel distinctions, at least one process configured to create new symbols, connect novel stimuli together for symbol groupings, update existing symbols to include connections to the new symbols, and assign weights to the connections, and at least one adaptation process configured to form stimulus-response pairs from received STM images. Also, at least one habituation process configured to provide time-based erosion of connection weights of symbols and at least one migration process to adapt learned responses to long term memories (LTM).

In another aspect, a method for building a short term memory (STM) structure within an operating system for processing is provided. The memory structures are in an STM image and include elements having attributes in time, space, and stimulus. The method comprises initializing filter elements, determining a setting for each filter element, applying a filter to each STM image element, determining if errors within the STM image elements are within bounds, and setting a focal point for each STM image based on whether the errors are within the bounds.

In still another aspect, a computer program for the propagation of signals through a connection system is provided. The signals are stored as symbolic associative stimulation (SAS) nodes configured for stimulation, carrier, and target information and the connection system is configured to store symbol structures in memory. The symbol structures include stimulus, temporal information, spatial information, and connection data for connectivity to other symbols. The computer program is configured to delay each SAS node for proper timing, set carrier attributes for propagation control, propagate a summed symbolic signal excitation by creating new SAS nodes for each carrier attribute, set the carrier attributes based on connection information and discard undelayed SAS nodes after processing of the nodes is completed.

In yet another aspect, a method for propagating signals through a connection system is provided. The signals are stored as symbolic associative stimulation (SAS) nodes configured for stimulation, carrier, and target information and the connection system is configured to store symbol structures in memory. The symbol structures include stimulus, temporal information, spatial information, and connection data for connectivity to other symbols. The method comprises delaying each SAS node for proper latency, setting a current symbol address for a symbol structure specified with target information in the SAS node, checking the SAS nodes for carrier information, adding stimulation to SAS nodes with a target information of stimulus and repeating the above steps for all SAS nodes. The method continues by resetting to the first SAS node, finding carrier SAS nodes by checking for matches between carrier information and target information within the SAS node. For matching information, a target excitation is calculated, a determination of whether excitation levels of current symbols is above a threshold takes place, a symbolic associative stimulation (SAS) node for processing of each connection is created, and SAS node attributes are set for propagated stimulus based on connection data. The steps for matching information are repeated for all other connections between symbols. For non-matching carrier information the SAS nodes are discarded and the method concludes by processing the next node for matches between carrier and target information.

In a further embodiment, a memory structure for storing short term memory (STM) images is provided. The images being representations of symbolic or neural firing, and the memory structure configured for the processing of the images. The memory structure comprises at least one input channel, at least one output channel and at least one abstract channel.

BRIEF DESCRIPTION OF THE DRAWINGS

FIG. 9A is one embodiment of a phase I assimilation process.

FIG. 16 is a software definition of an exemplary symbol structure.

FIG. 17 is a software definition of an exemplary symbol base structure.

FIG. 18 is a software definition of an exemplary symbol connection structure.

FIG. 19 is a definition diagram defining acronyms used in FIGS. 16, 17, and 18.

DETAILED DESCRIPTION OF THE INVENTION

Cognition can be defined as the processing of a time-series of thoughts and reactions which produce a result. The Cognitive Operating System (COS) described herein provides a cognitive capable environment for the processing of time-series stimuli and development of reactions to produce a results. The operating system does not attempt to duplicate higher brain functions or thought processes as in known applications. Rather, webs of highly connected symbols become the dominant unit through which thoughts are acted out, outputs become excited and learning processes in the brain become controlled.

Figure 1:
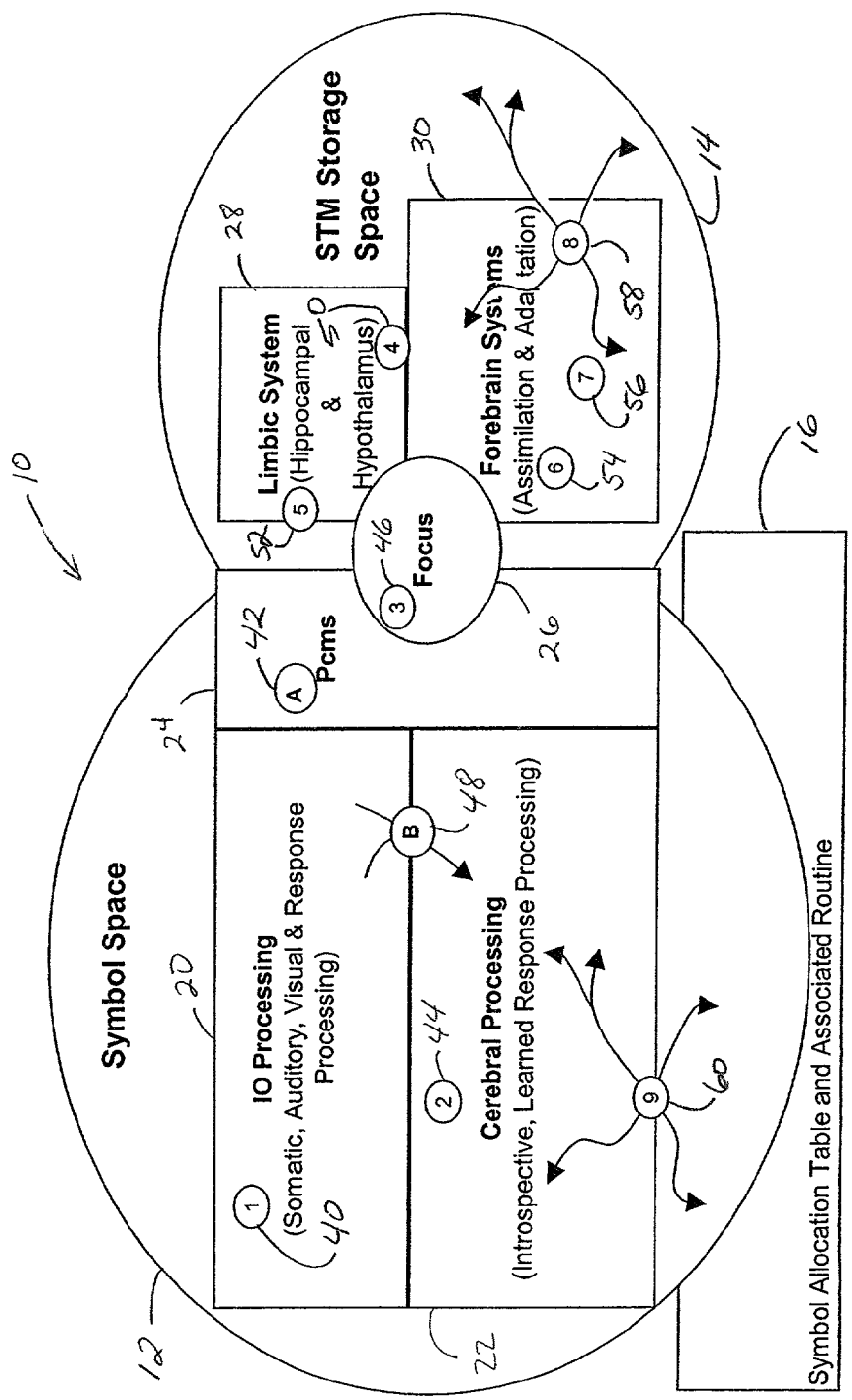
FIG. 1 is an overview of a Cognitive Operating System.

FIG. 1 is an overview of one embodiment of a Cognitive Operating System (COS) 10. COS 10 includes a memory structure which is allocated into a symbol space 12, a short term memory (STM) image space 14 and a symbol allocation table 16.

Symbol space 12 includes a plurality of processing areas, some of which overlap into STM image space 14. The processing areas include I/O processing 20, cerebral processing 22, PCMS 24 and focus 26. PCMS 24 and focus 26 overlap into STM image space 14. STM image space 14 further includes processing areas such as limbic system processing 28 and forebrain system 30. Cerebral processing 22 includes processing of abstract layer symbols to provide system 10 with learned response behaviors. Limbic system processing 28 processes hereditary behaviors and triggers innate responses and novelty cues while forebrain system 30 includes subprocesses which are described below.

The processing areas provide space for processes which are introduced here and described in further detail in subsequent figures. I/O processing area 20 includes an I/O process 40 which updates all simple inputs and outputs, visual, and auditory stimuli (visual and auditory stimuli are considered inputs in one embodiment) and also calls a STM load process, sometimes referred to as a PCMS function 42, which determines if a change has occurred within the symbol due to the stimulus, and if so, propagates the changed symbols forward, creates an STM image of the stimuli, for conscious processing, and for possible inclusion in STM image space 14. STM image space 14 houses references for symbols, allowing for easy manipulation when performing conscious processing. Responses, based upon inputs, are outputs provided in a basic form for integration.

I/O process 40 further interfaces to an internal symbolic associative stimulation (SAS) process 44 which passes stimulations to learned networks of connecting symbols based on the received external stimuli, and further interfaces to PCMS function 42 to create short term memory (STM) images of the changed symbols and propagates the symbols forward for possible inclusion into STM image space 14. Symbols are stored within a storage device (not shown) and are managed by symbolic allocation table (SAT) 16 routines.

A focus process 46 (described in detail below in FIG. 6) receives the STM (or alpha perspective) images from PCMS process 42, searches the images, and elevates the images to consciousness if the images are within dynamic temporal and spatial properties, which is sometimes referred to as filtering. Consciousness is defined within Cognitive Operating System 10 as STM images that remain active for processing in the forebrain functions (described below). Once an image's temporal latency exceeds temporal & spatial focal bounds, it is considered unconscious. A migration process 48 adapts learned responses, based upon received stimuli in I/O processing area 20, into long term, or introspective memories.

A hypothalamus process 50 propagates stimuli through hereditary structures for determination of innate behaviors. Hereditary structures provide protected structures which cannot be modified, i.e. traits. In multiple embodiments, hereditary structures include one or more of engineered symbol sets, neural networks, expert systems, and standard sequential code. Although the stimulation is based upon stimuli from I/O processing area, innate trait propagation is in processing area 28 because of storage requirements. Responses are developed and control domains stimulated as a result. If responses achieve predetermined level of stimulation, the symbols are elevated for incorporation into an assimilation process (described below). Responses are of an abstract type which can be created through the assimilation process.

Abstract type symbols are used to build associations, memories, and responses because the abstracts allow seamless connection to inputs, outputs, and hereditary traits within processing area 22, allowing temperment of innate traits. Responses are the actions produced by COS 10 and take many forms. Once incorporated into processing area 22, COS 10 can temper the reactions by assimilating connections and adapting ends, making processing area 22 predominant.

A hippocampal process 52 searches the forward propagated images for novelty among symbol groups. Each symbol group is checked independently, supporting structure building behavior. During loading in subconscious processes, STM images of symbols are stored based on their classifications within STM channels. As stated above, each channel is searched during the process to find similar conscious abstracts (i.e. responses embodied as connected symbols) within the current image groups. By examining STM images of the symbols, single-stimuli patterns are found. If no common abstracts are found, then novelty is stimulated. Also as a precursor to an assimilation process, described below, process 52 sums an excitation of the symbol group to assist in weight assignments during connection. Similar symbols, which may or may not become conscious due to stimulation, are identified to the assimilation process so not to be confused with other symbols. Contrasting data is always identified by inhibiting (or negative) symbols by the perspective. During process 52, conscious bi-polar symbol weights are present in short term memory. If novelty stimulus bundles are found, then the connections are based on the firing equal that of the sum of the bi-polar symbol weight stimulations. Both hypothalamus process 50 and hippocampal process 52 are processes within limbic system processing 28.

An assimilation process 54 receives forward propagated images from focus process 46 and connects the referenced symbols to the newly stimulated symbols. Assimilation process 54 joins together, for example, stimuli, networks, ideas, feelings, visuals, and sounds. Before assimilation process 54 begins, all of the above described information has been sorted, tagged and presented to process 54 for effective assimilation into associated memory and control systems (not shown). Two important forms of assimilation take place during process 54. Distinctive Stimulus Definitions, the first form (described in FIG. 9A below), is the connecting of novel stimuli together for symbol groupings. The connections of like stimuli build the experience (or Pex) attributes of the symbol connection data and represent actuality. Actuality, a primary psychological control mechanism recognized by modern psychology, is used to drive further propagation of signals to connecting symbols. Distinctive Stimulus Definitions, if properly triggered, allocate and create a new abstract for each symbol classification group. Symbol groupings provide abstract symbolization of the experience for more efficient and effective processing. Temporally & spatially connected symbols provide the controls, memory and psychology necessary for COS 10 and represent systems which are always in a constant state of flux due to environmental changes.

Association is the second form which assimilates all of the abstract data together based on temporal and spatial contiguity. Temporal and spatial data is incorporated into the connections based on a novel abstract and orientated about the center of the data. Association takes the form of connecting abstract data symbols to each other based on temporal and spatial contiguity. The contiguity is driven by the perspective boundaries which sets the maximum temporal and spatial differences that must be met to assimilate data. Increasing connections (e.g. connection weights) offer more resistance to changes in the data. The connections of abstract data symbols build the introspective (or Pin) attributes of symbol connection data and represent expectation. Expectation, a primary psychological control mechanism recognized by modern psychology, is opposite of actuality and measures what should be based on experiences. Associations work to stimulate or inhibit symbols for further processing and become the switching mechanism for the web of connected symbols.

An adaptation process 56 receives forward propagated images from focus process 46 and forms stimulus-response pairs, and using a learning algorithm (not shown), adapts connection weights of the response connections for reinforcement learning. A STM habituation process 58 is configured to clear older STM images by tracking a counter until the counter reaches a set value. For example, if a STM image becomes inactive, process 58 discards the image after a period of time (i.e., the counter reaches the set value before the image has again become activated). Assimilation process 54, adaptation process 56, and STM habituation process 58 are processes within forebrain processing 30.

Finally, a long term memory (LTM) habituation process 60 is configured to weaken connection weights of interconnected symbols, based upon time, within cerebral processing area 22. The weakening is accomplished by driving down the connection weights between symbols and thereby purging STM image space 14 within system 10 of weaker responses which are common in undesired behaviors.

Figure 2:
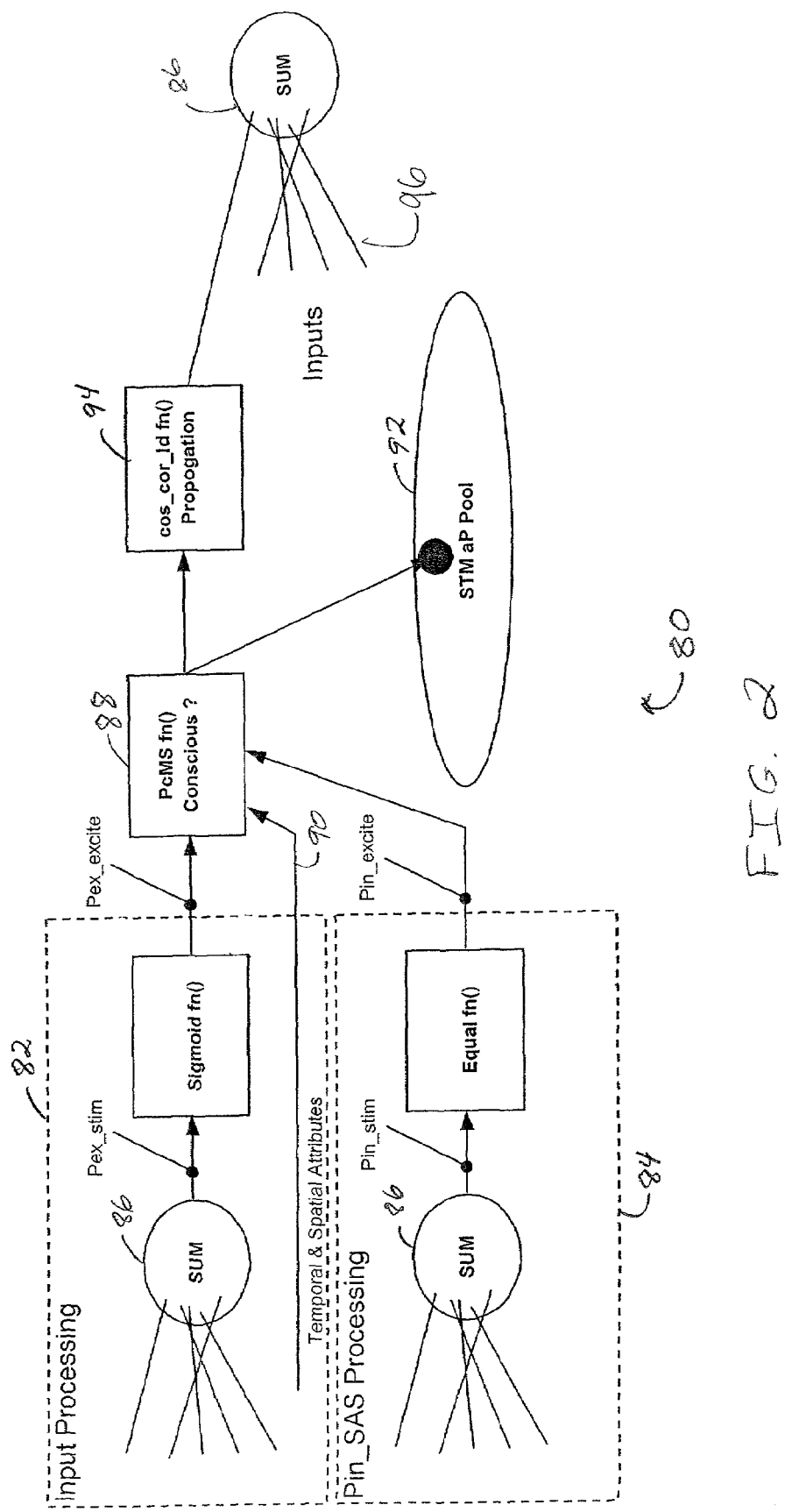
FIG. 2 is a function flow diagram showing some of the processes described in FIG. 1.

FIG. 2 is a function flow diagram 80 showing some of the processes described in FIG. 1. Diagram includes input processing 82 and internal symbolic associative stimulation (SAS) processing 84 where various stimuli are received and summed 86 and forwarded to focal processing 88 where the images are elevated to consciousness, if temporal and spatial attributes 90 so dictate. Conscious images are then used to update a STM images symbol pool 92 and as inputs to a propagation function 94. Multiple propagated symbols serve as inputs 96 which are summed for consciousness 86, whereupon the process shown in diagram 80 is repeated.

Figure 3:
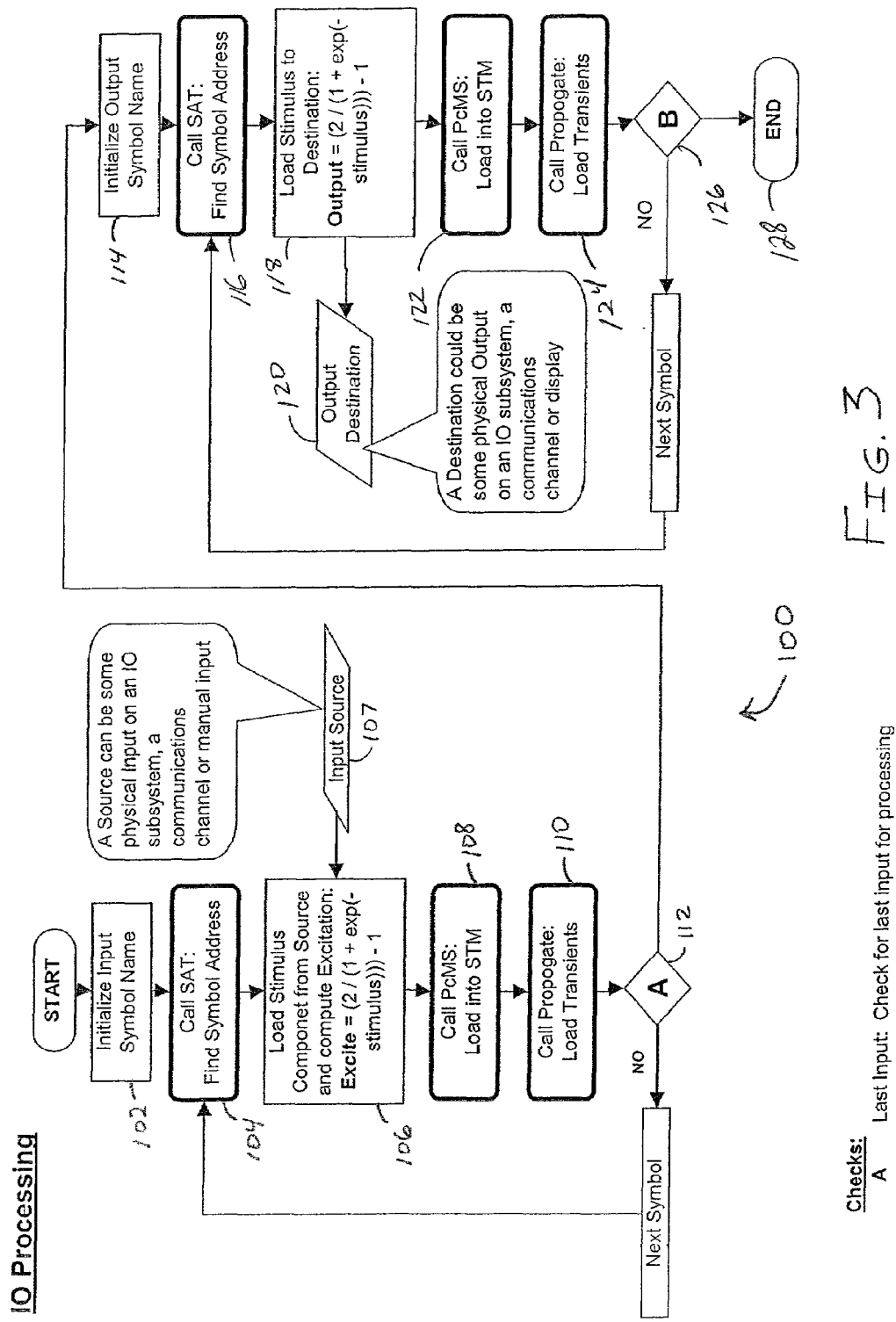
FIG. 3 is one embodiment of an I/O processing process.

FIG. 3 is one embodiment of an I/O processing process 100. Process 100 is an embodiment that can perform the processing described for I/O processing area 20 (shown in FIG. 1). Process 100 starts by initializing 102 input symbol names. Then a symbol allocation table (SAT) handler is called 104 to load a symbol address for the initialized 102 symbol name. Although not shown in the Figure, The SAT handler can allocate memory resources when the symbol space is not currently loaded in memory, otherwise the SAT handler references the memory location. A stimulus is loaded 106 from a source 107 (e.g. a physical input on an I/O subsystem) and an excitation is computed. After an excitation is computed, a PCMS handler is called 108, to load the symbol and its excitation into short term memory, then a propagation handler is called 110 for processing of the symbol, for example, for traits of responses. Process 100 then checks 112 if other inputs remain for processing. If so, the above described process is repeated until no additional inputs remain, at which point, output symbols are processed.

For processing of outputs, output symbols named are first initialized 114. Then a symbol allocation table (SAT) handler is called 116 to load a symbol address for the initialized 114 symbol name. A stimulus is loaded 118 and an output computed, for output to a destination 120 (e.g. a physical input on an I/O subsystem). After output, a PCMS handler is called 122, to load the symbol and its value into short term memory, then a propagation handler is called 124 for processing of the symbol. Process 100 then checks 126 if other outputs remain to be processed. If so, the above described process is repeated until no additional outputs remain, at which point, process 100 ends 128.

Figure 4:
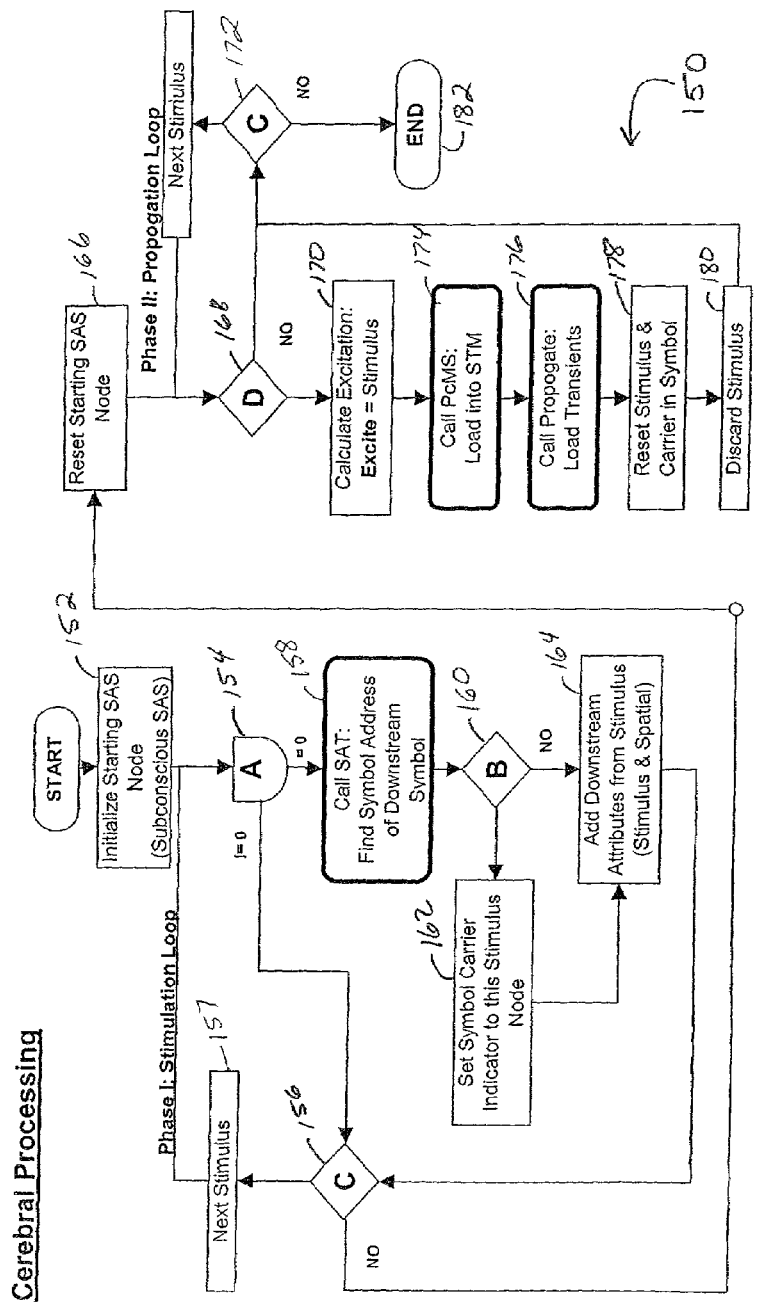
FIG. 4 is one embodiment of a cerebral processing process.

FIG. 4 is one embodiment of a cerebral processing process 150. Process 150 illustrates the processes within cerebral processing 22 processing area (shown in FIG. 1) and begins with an initialization 152 of a starting symbolic associative stimulation (SAS) node. A temporal attribute of the node is checked 154, and if the attribute is not equal to zero, the attribute is decremented by one, delaying each SAS node for proper latency, and process 150 checks 156 for additional nodes, which are then processed. If the attribute is zero, a symbol allocation table (SAT) handler is called 158 to determine a symbol address for a symbol structure associated with the node. The symbol's carrier attributes are checked 160 for an address, no address meaning no carrier assigned. If a carrier has been assigned, a symbol carrier address for the stimulus to the SAS node is set 162. Otherwise, attributes are added 164 from the stimulus to the target symbol within the node and then process 150 checks 156 for additional nodes. The process is repeated for all SAS nodes.

If no additional nodes exist, the starting SAS node is reset 166 and the carrier in the symbol and an address of the SAS node are checked 168. If the SAS node and the carrier match, a target excitation is calculated 170 which is equal to the stimulus. If the SAS node and the carrier do not match, process 150 determines 172 if additional nodes exist, and, if so, repeats the symbol and address check described above. After all nodes are checked 168 and excitations calculated 170, a PCMS handler is called 174, to load the nodes into short term memory, then a propagation handler is called 176 for processing of the symbol. Process 150 then resets 178 stimuli and carrier within the symbol, and the stimuli are discarded 180. If other stimuli remain to be processed, the above described process is repeated until no additional outputs remain, at which point, process 150 ends 182.

Figure 5:
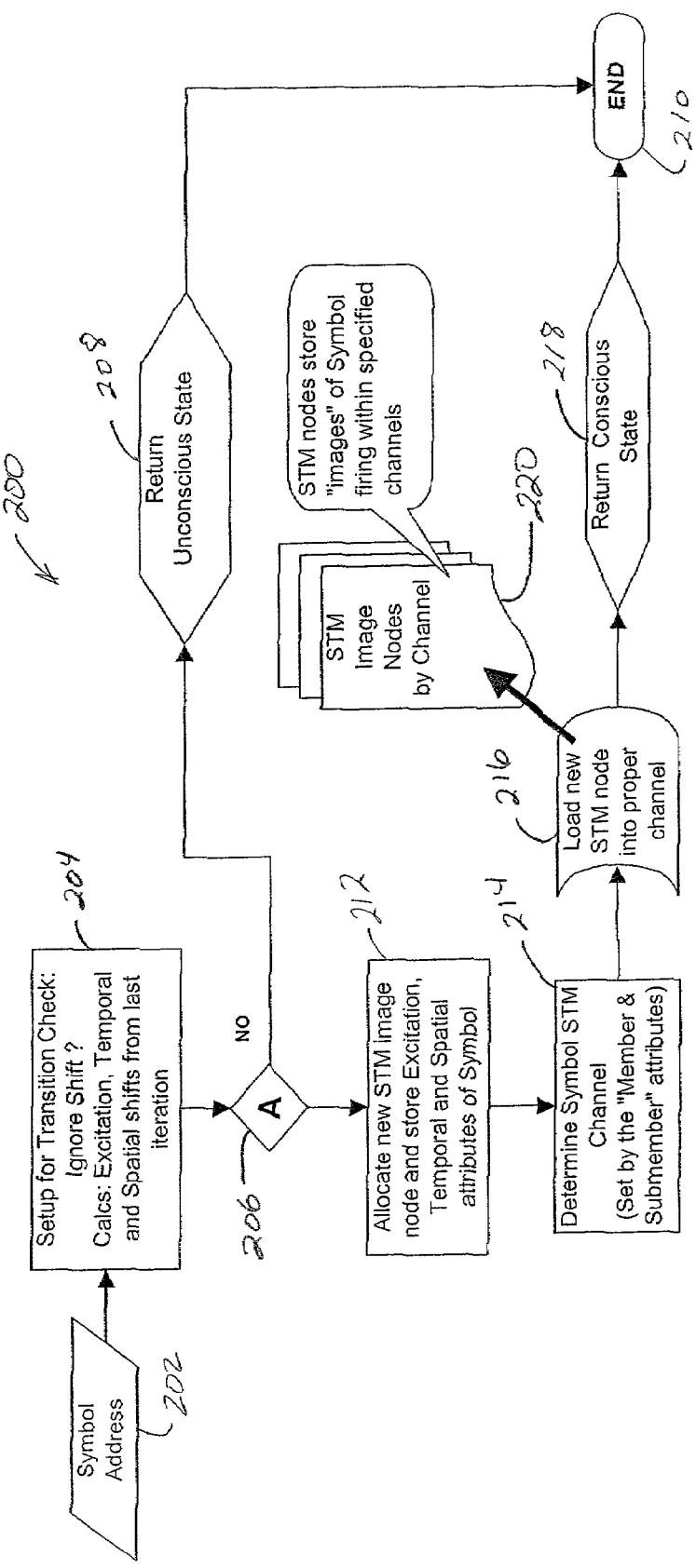
FIG. 5 is one embodiment of a perspective minimum and STM load (PCMS) process.

FIG. 5 is one embodiment of a perspective minimum and STM load (PCMS) process 200. For each symbol address 202, a transition check is setup 204, including calculation of excitations, temporal shifts, and spatial shifts from a previous iteration. The excitation levels are checked 206, and if not above a threshold, process 200 returns 208 the symbol to an unconscious state and process 200 ends 210. If there are shifts from a previous iteration a new SAS node is allocated 212, for the processing of connections. Excitation levels, temporal attributes, and spatial attributes of the symbol are set and stored based on connection data. An STM channel is determined 214 for each symbol (set by member and sub-member attributes) and the new STM node is loaded 216 into the determined channel, and returned 218 to a conscious state, whereupon process 200 ends 210. It is to be noted that in the embodiment described, STM image nodes are stored 220 according to channel.

Figure 6:
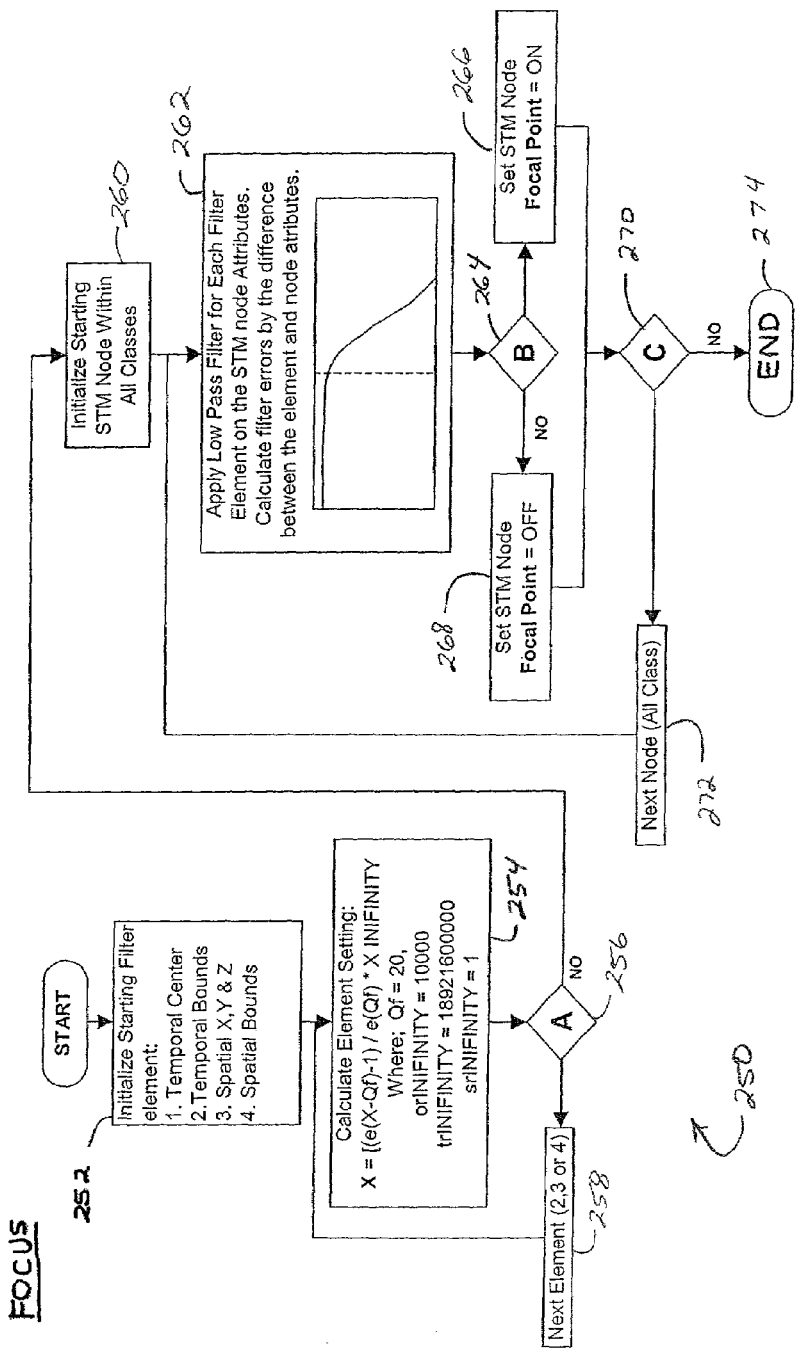
FIG. 6 is one embodiment of a focus process.

FIG. 6 is one embodiment of a focus process 250. Starting filter elements within process 250, include, but are not limited to, temporal center elements, temporal bounds elements, spatial position (X, Y, Z) elements, and spatial bounds elements. The starting filter elements are initialized 252, then an element setting is calculated 254 for each element. An image is then checked 256 for additional elements. If additional elements exist, process 250 returns 258 to calculate element settings for the next element. Otherwise, starting STM nodes within all classes are initialized 260 and a low pass filter is applied 262 for each filter element on the STM node attributes. Filter errors are calculated as a difference between element attributes and node attributes. Temporal errors are checked 264 to ensure they are less than temporal bounds and spatial errors are checked 264 to ensure they are less than spatial bounds. If the errors are within the bounds an STM node focal point is set 266 to ON, otherwise, the STM node focal point is set 268 to OFF. Then, a determination is made 270, as to if there are any more STM nodes. If so, the low pass filter is applied 262 to the other nodes. When all nodes are completed, process 250 ends 274.

Figure 7:
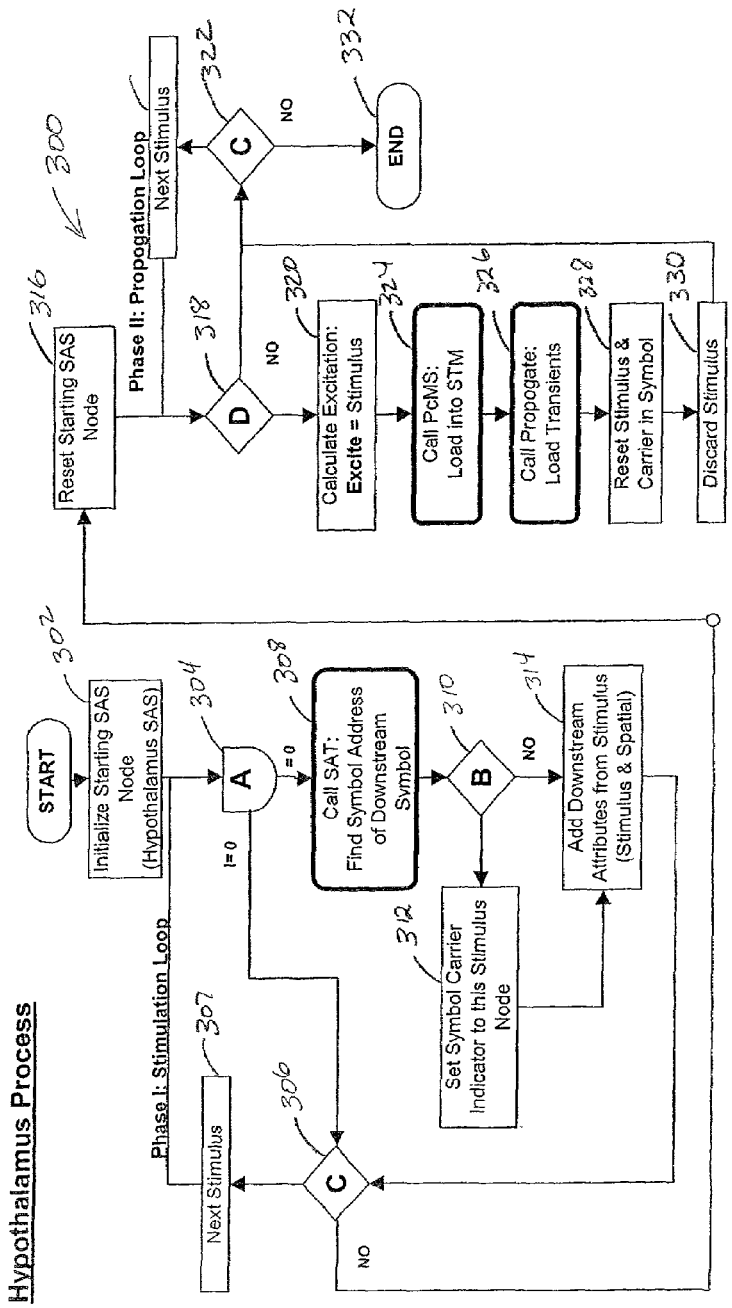
FIG. 7 is one embodiment of a hypothalamus process.

FIG. 7 is one embodiment of a hypothalamus process 300. Process 300 embodies hypothalamus process 50 within limbic system 28 processing area (both shown in FIG. 1) and is similar to the subconscious cerebral processing process 150 shown in FIG. 4. Process 300 operates on SAS nodes for hereditary structures. Hereditary structures are symbols that are marked as such, and in one embodiment, receive an exclusive status and are therefore guarded from learning and habituation processes, thus preventing an altering of traits within these structures.

Process 300 begins with an initialization 302 of a starting symbolic associative stimulation (SAS) node. A temporal attribute of the node is checked 304, and if the attribute is not equal to zero, the attribute is decremented by one (representing iterations) and process 300 checks 306 for additional nodes, which are then processed 307. If the attribute is zero, a symbol allocation table (SAT) handler is called 308 to determine an address for a symbol associated with the node. The symbol's carrier attributes are checked 310 for an address, no address meaning no carrier assigned. If a carrier has been assigned, a symbol carrier indicator for the stimulus node is set 312. Otherwise, stimulus and spatial attributes are added 314 from the stimulus to the target symbol and then process 300 checks 306 for additional nodes.

If no additional nodes exist, the starting SAS node is reset 316 and the carrier in the symbol and an address of the SAS node are checked 318. If the SAS node and the carrier match, an excitation is calculated 320 which is equal to the stimulus and enables propagation of the stimuli. If the SAS node and the carrier do not match, process 300 determines 322 if additional nodes exist, and, if so, repeats the symbol and address check described above. After all nodes are checked 318 and excitations calculated 320, a PCMS handler is called 324, to load the nodes into short term memory, then a propagation handler is called 326 for processing of the symbol (loading of transients). Process 300 then resets 328 stimuli and carrier within the symbol, and the stimuli are discarded 330. If other stimuli remain to be processed, the above described process is repeated until no additional outputs remain, at which point, process 300 ends 332.

Figure 8:
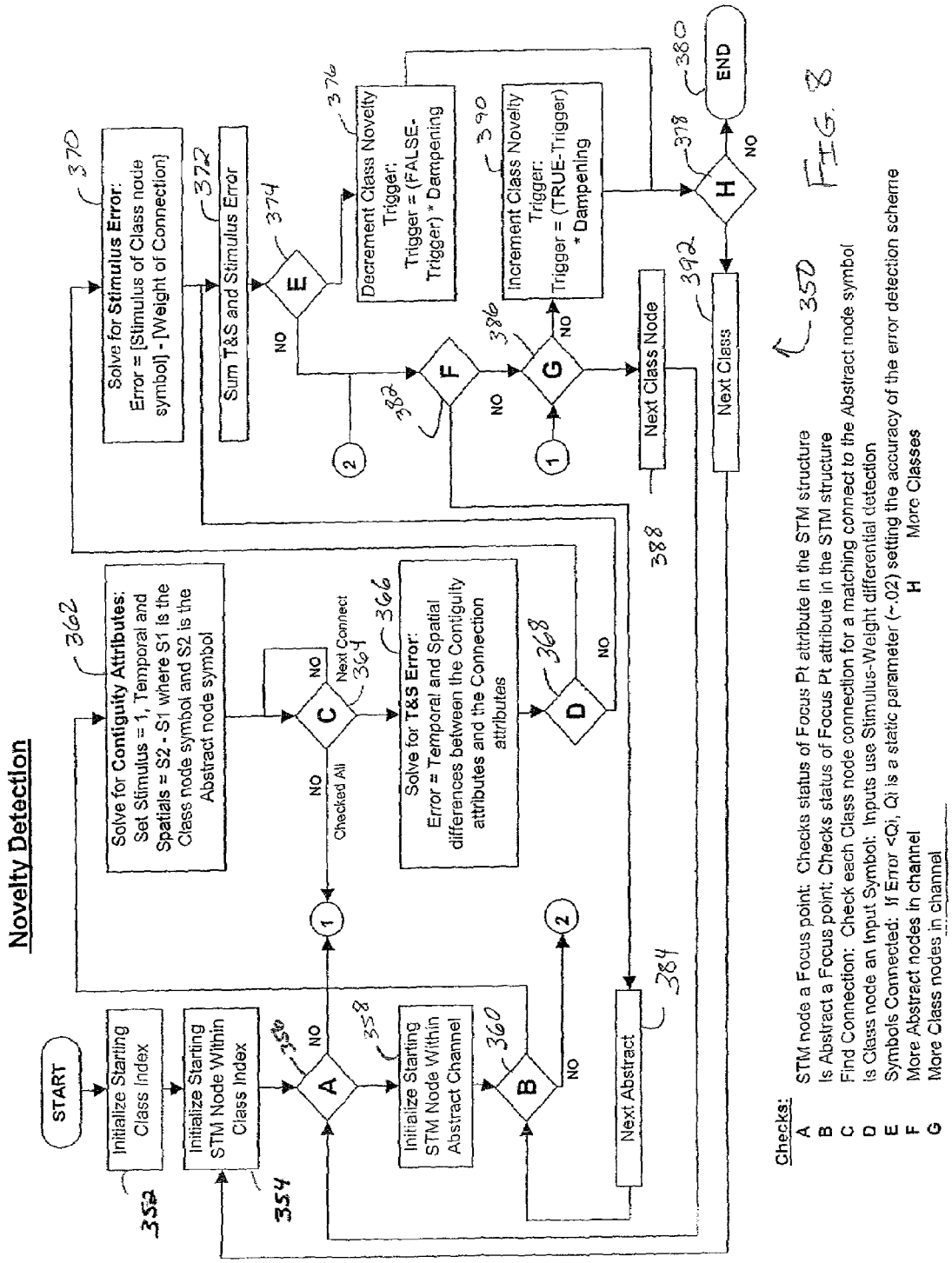
FIG. 8 is one embodiment of a novelty detection process.

FIG. 8 is one embodiment of a novelty detection process 350. Process 350 illustrates a hippocampal process 52 within limbic system 28 processing area (both shown in FIG. 1) and begins with an initialization 352 of a starting class index. Then a starting STM node within the class index is initialized 354. Next a determination is made 356 as to whether the STM node is a focus point. If not a focus point, process checks for more class nodes in the channel, as described below. If a focus point, a status check of a focus point attribute in the STM structure is performed and the starting STM node is initialized 358 within an abstract channel. Next, a determination is made 360 as to whether the abstract is a focus point. If so, process 350 solves 362 for contiguity attributes by setting a stimulus to 1, temporals and spatials are set to a class node symbol subtracted from a abstract node symbol. If the abstract is not a focus point, process 350 determines if there are further abstract nodes in the channel as further described below.

Each class node is checked 364 for a matching connection to the abstract node symbol. After each node is checked, temporal and spatial errors are solved 366, where the errors are defined as temporal and spatial differences between contiguity attributes and connection attributes. Each class node is checked 368 for a determination if the node is an input symbol. If the node is an input symbol, a stimulus error is calculated 370, and whether or not the node is an input symbol, the temporal error, the spatial error and the stimulus error are summed 372.

The error sum is checked 374, and if the error sum is less than a specified threshold, a class novelty trigger is decremented 376. In one embodiment, the class novelty trigger is calculated as a false trigger value multiplied by a dampening factor. After decrementing 376 the novelty trigger, process 350 determines 378 if there are more classes for which novelty is to be determined, if not, process 350 ends 380. If the error sum is greater than the specified threshold, process 350 determines 382 if there are more abstract nodes in the class channel, if so, a next abstract is processed 384. If there are no new abstract nodes in the channel, process 350 determines 386 if there are more class nodes in the channel. If so, a next class node is processed 388. If there are no more class nodes in the channel, the class novelty trigger is incremented 390, where the class novelty trigger is, in one embodiment, defined as a true trigger value multiplied by a dampening factor. After incrementing the class novelty trigger, process 350 determines 378 if there are more classes. If not process 350 ends, otherwise, a next class is processed 392 by process 350 resulting in novel data falling through to stimulate novelty trigger 390.

FIG. 9A is one embodiment of a Distinctive Stimulus Definition process 400 which builds experience (Pex) connections for actuality. Process 400 illustrates imprinting processing within forebrain systems 30 processing area (shown in FIG. 1) and begins with an initialization 402 of a starting class index. The class novelty trigger is then checked 404. If the novelty trigger is not true, process 400 determines 406 if there are any more classes. If there are no more classes, process 400 ends 408. If the novelty trigger is true, a starting STM node within the class index is initialized 410. For all focal points within the class channel, temporal and spatial attributes are then summed 412. Temporal and spatial attributes within the class channel are also averaged 414, thereby defining a center of the set. Process 400 then creates 416 a new abstract symbol, whereupon a starting STM node within the class index is initialized 410. Next process 400 defines 420 contiguity for connections. In one embodiment, contiguity definitions include a stimulus contiguity which is a class node stimulus, a temporal contiguity which a negative one for an experience type connection, and a spatial contiguity which is an average channel spatial attribute minus a node spatial attribute. Process 400 determines 422 if the class is a response class, and if so, allocates 424 a connection structure by setting the class node symbol to parent, the new abstract symbol to child, and setting connection attributes from contiguity attributes. If the class is not a response class, process 400 allocates 426 a connection structure by setting the class node symbol to child, the new abstract symbol to parent, and setting connection attributes from contiguity attributes. After either of allocation 424 or allocation 426, process determines 428 if there are any more class nodes. If so, the next class node is processed 430. If there are no more class nodes within the class process 400 determines 406 if there are additional classes. If not process 400 ends. Otherwise, process 400 begins processing 432 of the next class.

Figure 9B:
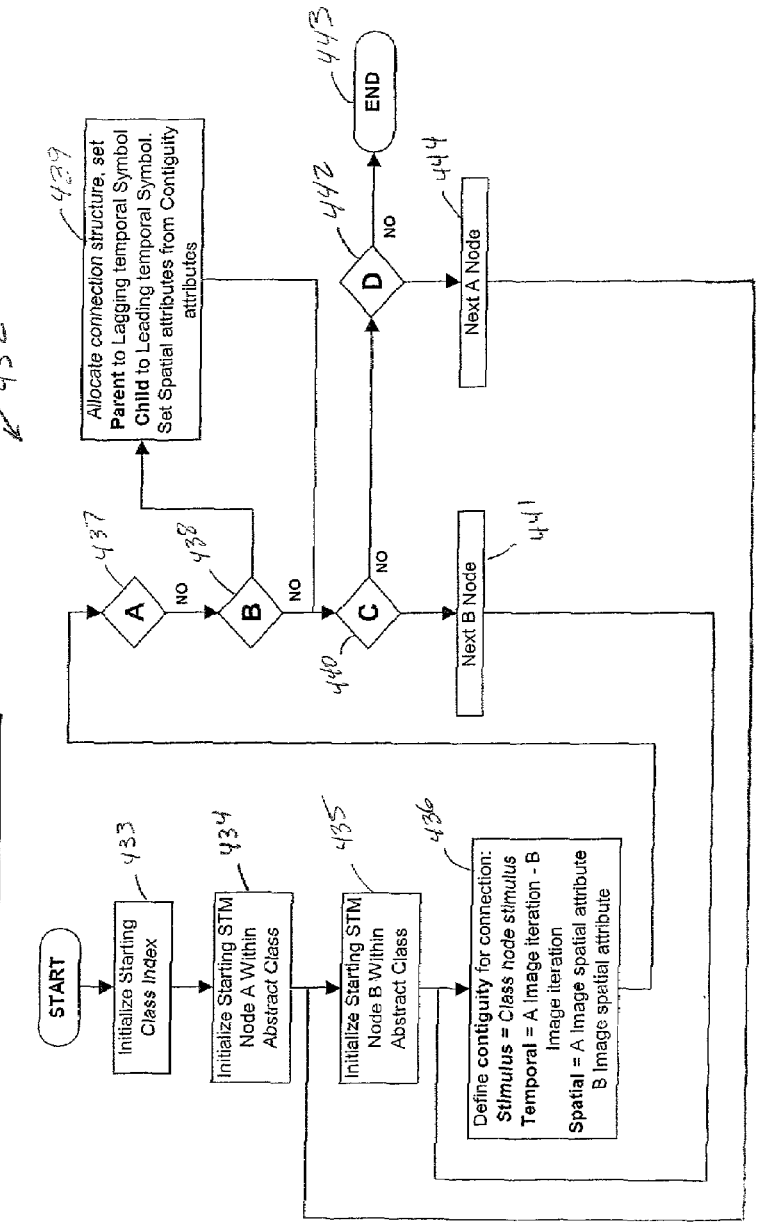
FIG. 9B is one embodiment of a phase II assimilation process.

FIG. 9B is one embodiment of an association process 432 which builds (assimilates) introspective (Pin) connections for expectation. Process 432 illustrates association processing within forebrain systems 30 processing area (shown in FIG. 1) and begins with an initialization 433 of a starting class index. A starting STM A class node within the abstract class is initialized 434. A starting STM B class node the within abstract class is initialized 435. Next process 432 defines 436 contiguity for connections. In one embodiment, contiguity definitions include a stimulus contiguity which is a class node stimulus, a temporal contiguity which an A class image iteration minus a B class image iteration, and a spatial contiguity which is an A class image spatial attribute minus a B class spatial image attribute. Process 443 determines 437 if the symbols are focal points. If not, process 432 determines 438 if the symbols are connected. If the symbols are connected, process 432 allocates 439 a connection structure by setting a lagging temporal symbol to parent, a leading temporal symbol to child, and setting spatial attributes from contiguity attributes. After allocation 439 of connection structure or if symbols are unconnected, process 432 determines 440 if there are any more B class nodes. If so, the next B class node is processed 441, beginning with contiguity definition 436. If there are no more B class nodes process 432 determines 442 if there are additional A class nodes. If not process 432 ends 443. If there are additional A class nodes, the next A class node is processed 444, beginning with initialization 435 of the starting STM B class node the within abstract class.

Figure 10:
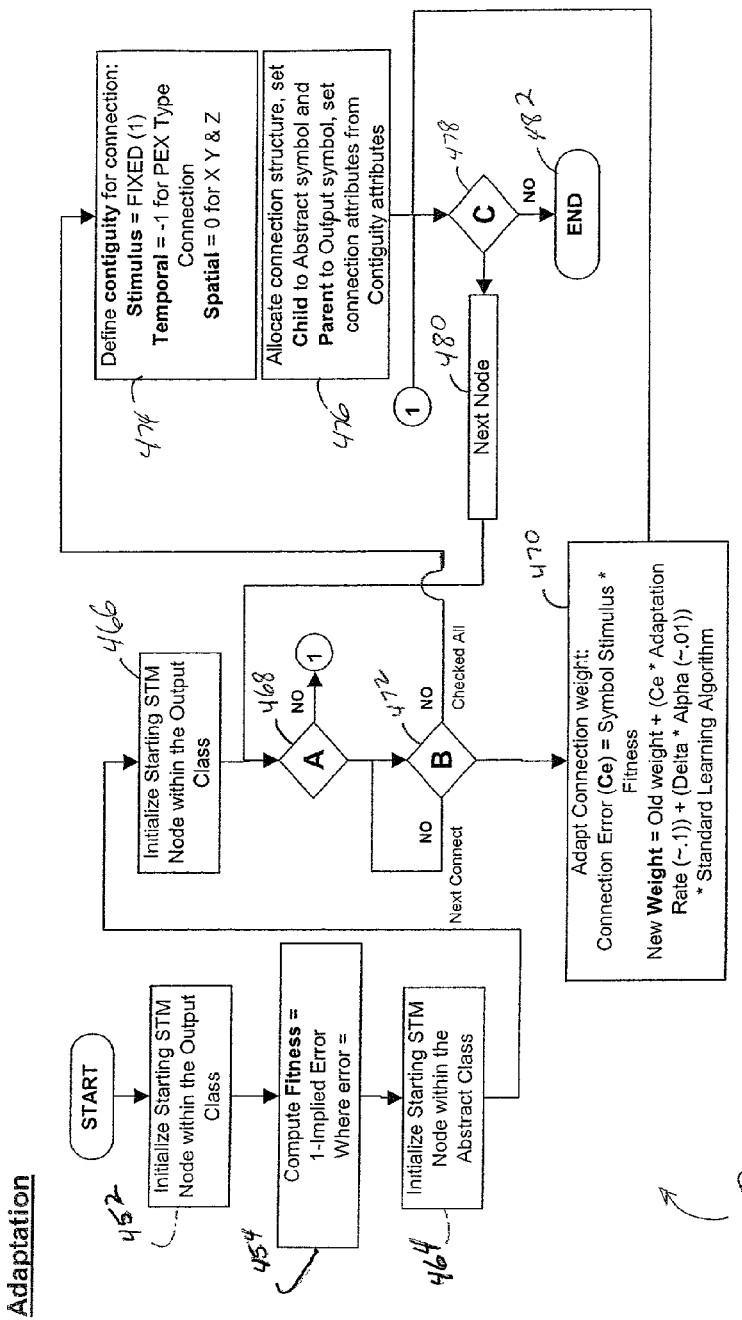
FIG. 10 is one embodiment of an adaptation process.

FIG. 10 is one embodiment of an adaptation process 450. Process 450 illustrates processing within forebrain systems 30 processing area (shown in FIG. 1) and begins with an initialization 452 of a starting STM node within an output class. Process 450 then computes 454 a fitness, which is equal to one minus an implied error, which is defined. Initialization 464 of a starting STM node within the abstract class is processed, as is initialization 466 of a starting STM node within an output class. Process 450 then determines 468 if the abstract expectation and output are both focal points. If not, process 450 adapts 470 connection weights. In one embodiment, connection weights are adapted 470 by calculating a connection error (CE) as a symbol stimulus multiplied by a fitness. The new connection weight is then calculated as old weight+(CE×an adaptation rate)+(a delta×an alpha), a standard learning algorithm. In one embodiment, the adaptation rate is approximately 0.1 and alpha is approximately 0.01.

If the abstract and output are both focal points, each class node connection is checked 472 for a matching connections to abstract node symbol until all class node connections are checked 472. If there is a matching connection, connection weights are adapted 470, as described above. After all class node connections are checked 472, and if there are no matches, contiguity is defined 474 for connections. In one embodiment, contiguity is defined 474 as a fixed stimulus, temporal attributes as a negative one for experience type connections, and spatial attributes as) for X, Y, and Z. Next, process 450 allocates 476 connection structures, in one embodiment by setting the abstract symbol to child, the output symbol to parent, and setting connection attributes from contiguity attributes. Process 450 determines 478 if there are more abstract nodes to be processed, if so, a next abstract node is processed 480, otherwise process 450 ends 482.

Figure 11:
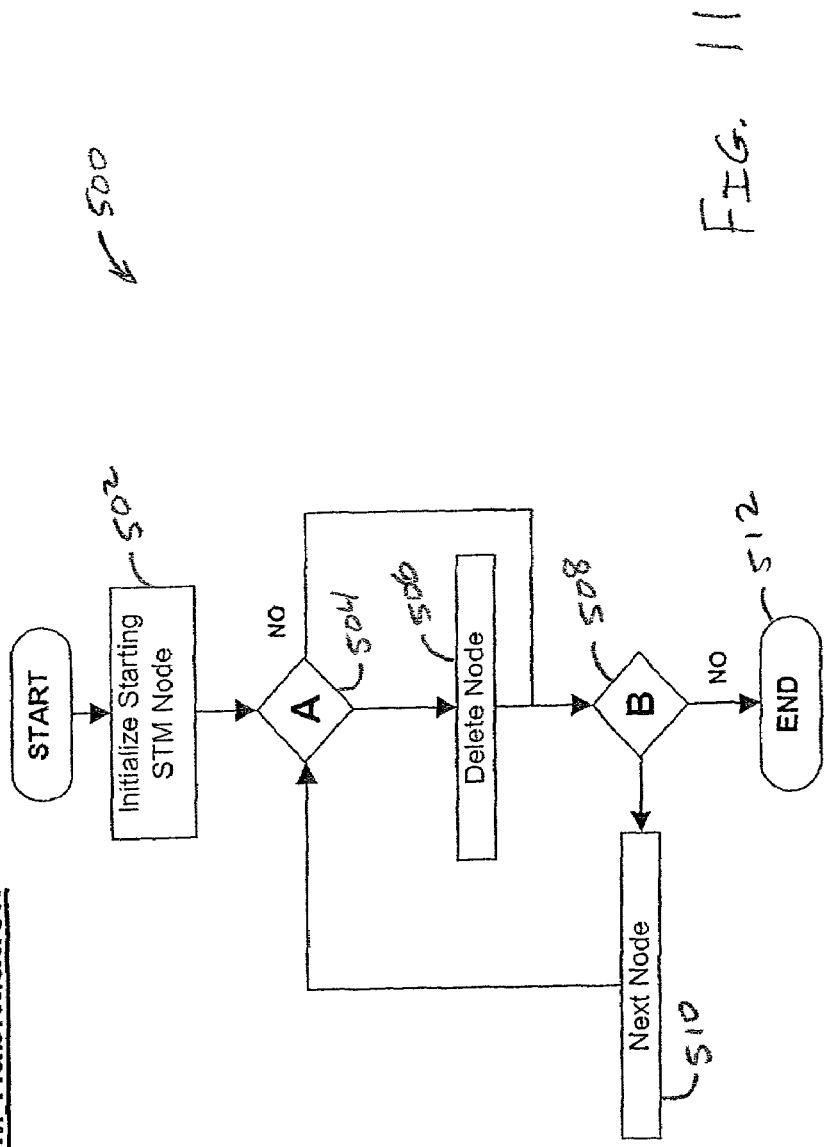
FIG. 11 is one embodiment of a short term memory habituation process.

FIG. 11 is one embodiment of a short term memory (STM) habituation process 500. Process 500 illustrates processing within forebrain systems 30 processing area (shown in FIG. 1) and begins with an initialization 502 of a starting STM node. If a last focal point iteration for a STM node is determined 504 to be greater than a predetermined cutoff, the node is deleted 506. Otherwise, process 500 determines 508 if there are any more nodes. If there are additional nodes, the next node is processed 510, otherwise process 500 ends.

Figure 12:
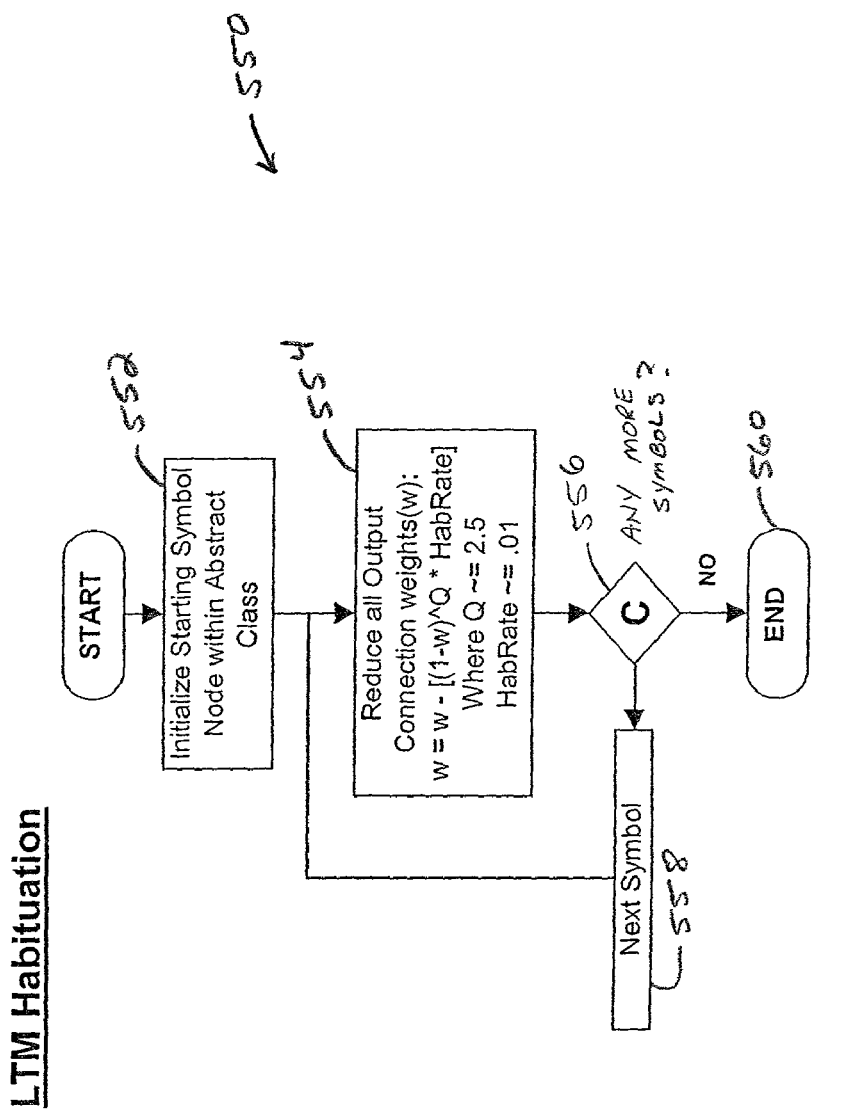
FIG. 12 is one embodiment of a long term memory habituation process.

FIG. 12 is one embodiment of a long term memory (LTM) habituation process 550. Process 550 illustrates processing within cerebral processing area 22 and within symbol space 12 (both shown in FIG. 1) and begins with an initialization 552 of a starting symbol node within an abstract class. Then, all output connection weights are reduced 554. In one embodiment, connection weights are calculated as an old connection weight minus $(1-w)^Q \times$ a habituation rate. Where, in one specific embodiment, Q is approximately 2.5 and the habituation rate is approximately 0.01. Next, if it is determined 556 that there are additional symbols to process, the next symbol is processed 558, otherwise, process 550 ends 560.

Figure 13:
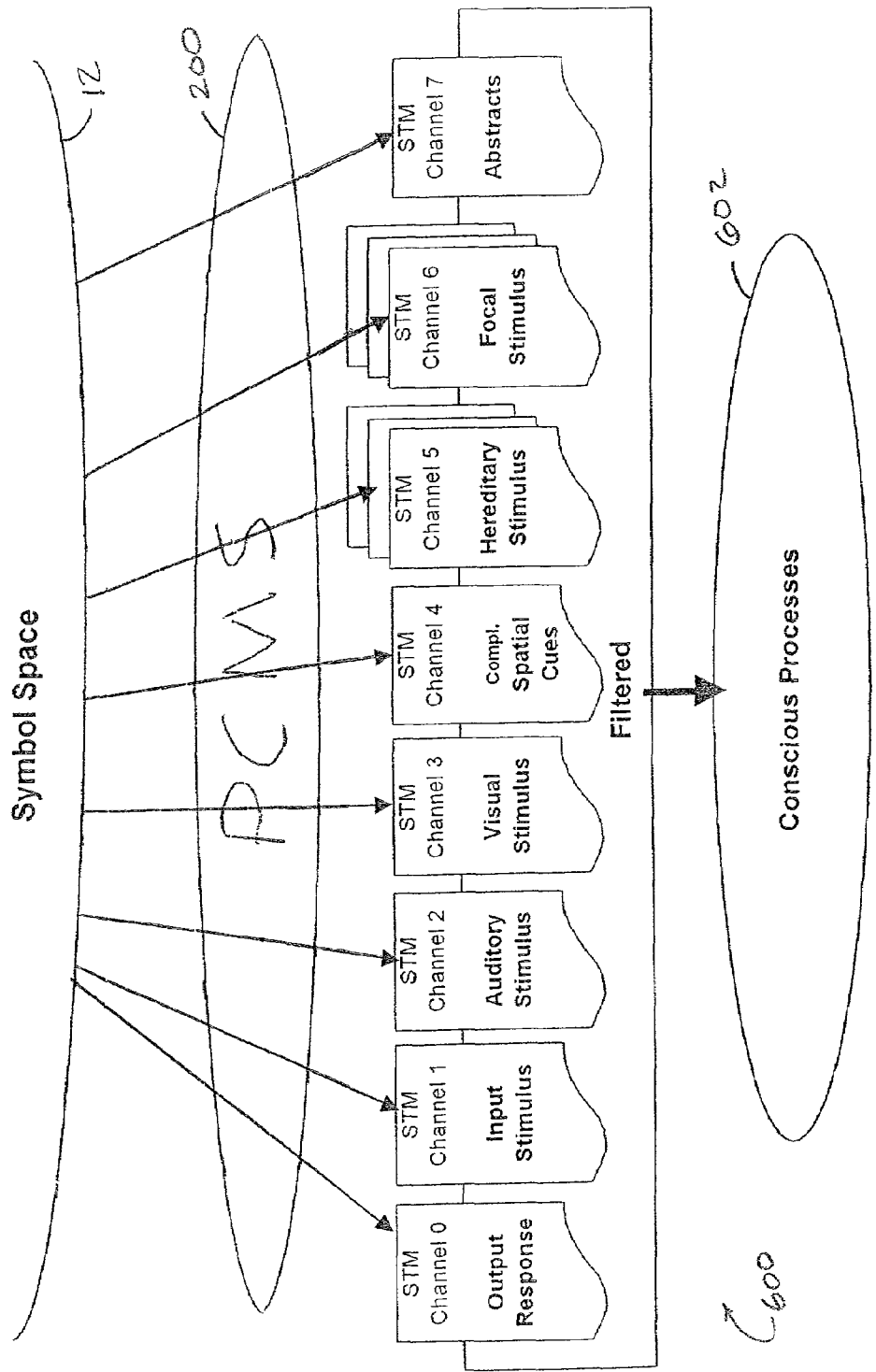
FIG. 13 is an illustration of allocation of symbol space based on short term memory channels.

FIG. 13 is an illustration 600 of allocation of symbol space 12 based on short term memory (STM) channels which are filtered into conscious processes 602. Symbols are allocated through PCMS process 200 (shown in FIG. 5) for STM channels. In one embodiment, STM channels (also referred to as alpha perspective storage channels) include, but are not limited to, output responses, input stimuli, auditory stimuli, visual stimuli, complementary spatial cues, hereditary stimuli, focal stimuli and abstracts. Conscious processes include, but are not limited to, focal process 46, hypothalamus process 50, assimilation process 54, and adaptation process 56 (all shown in FIG. 1).

Minimum STM channel design calls for separation of outputs, simple inputs, and complex input stimuli, for example, auditory, visual and complementary spatial cues. Hereditary and focal stimulus channels, are, in one embodiment, divided into subclass channels for further clarity. Filtering, and conscious processes use STM images during processing (as described above) using references within the nodes for symbol access. Focus status is also maintained within the STM structure preventing further memory allocation by separate processes.

Figure 14:
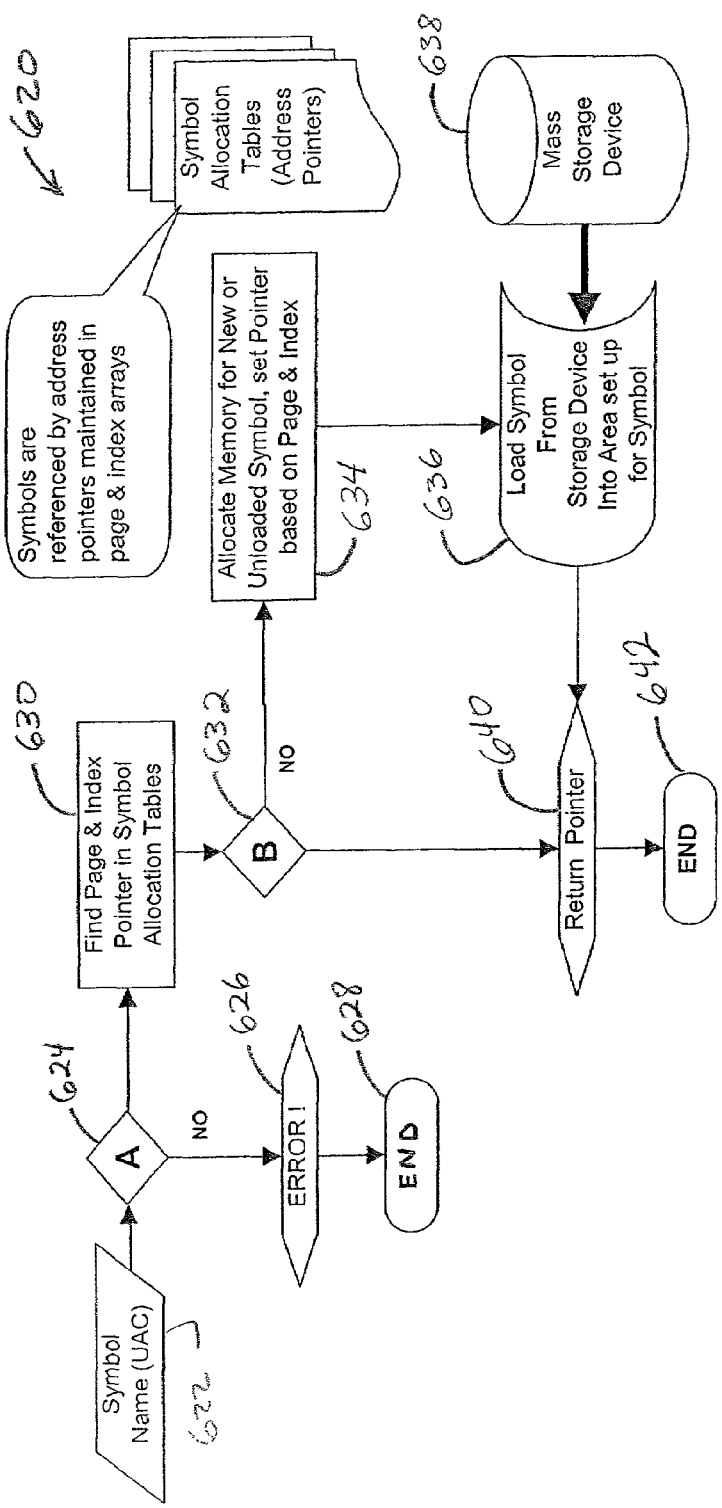
FIG. 14 illustrates one embodiment of a symbol allocation process used for assignment of symbols for storage in symbol allocation table.

FIG. 14 illustrates one embodiment of a symbol loading process 620 used for assignment of symbols for storage in symbol allocation table 16 (shown in FIG. 1) and referenced, for example, as a function call in FIG. 3, reference numeral 104. First, a symbol name is allocated 622, with symbols having variable length alphanumeric codes (UACs), and checked 624 to determine if the allocated 622 symbol name is valid. If invalid, an error handler is called 622 and process 620 ends 628. In one embodiment, valid symbol names are 32 bit ASCII strings. If the symbol name is valid, process 620 finds 630 a page pointer and an index pointer, referred to collectively as pointer references, for the symbol in symbol allocation table 16. To determine if the symbol has been properly loaded, an array position in memory is checked 632 based upon the page pointer and index pointer. If the array position in memory is blank, indicating that no symbol structure was allocated or loaded for the particular symbol, memory is allocated 634 for a new or unloaded symbol, and the pointer is set based upon page and index pointers. The symbol is then loaded 636 from a mass storage device 638 into the area set up for the symbol, and a return pointer value is set 640, whereupon process 620 ends 642. If the array position in memory indicates that a symbol structure was allocated or loaded for the particular symbol allocated, the return pointer value is set 640, and process 620 ends 642.

Figure 15:
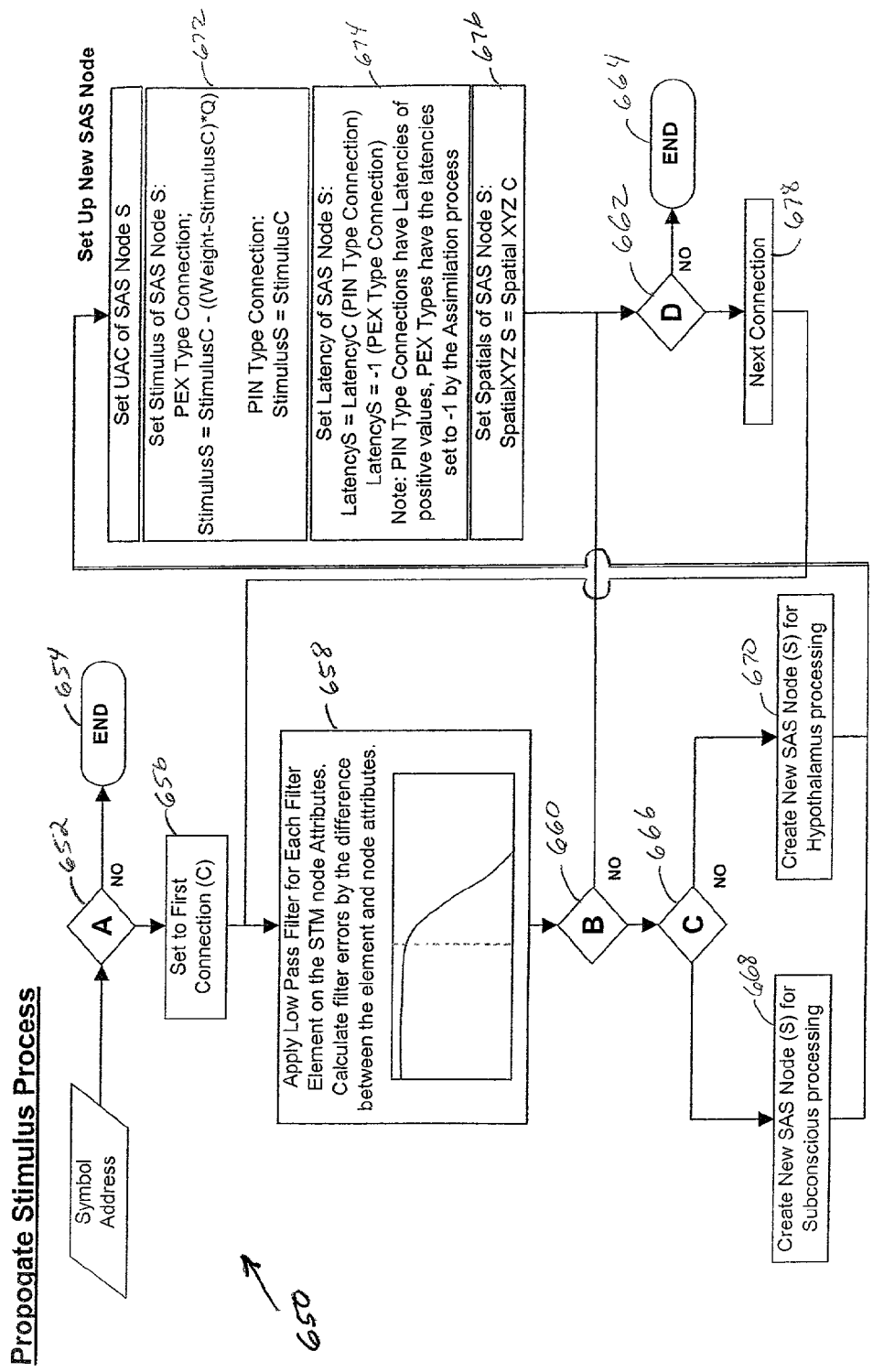
FIG. 15 illustrates one embodiment of a propagate stimulus process.

FIG. 15 is one embodiment of a propagate stimulus process 650. Process 650 is called by several of the processes earlier described, for example, 176 (shown in FIG. 4) and 326 (shown in FIG. 7) and begins with a determination 652 of whether a symbol excitation level or an introspective excitation level, referred to collectively as energy level, exceeds a minimum value, in one embodiment the minimum value is approximately 0.02. If the minimum level is not exceeded, process 650 ends 654. If the excitation levels are exceeded, process 650 sets 656 a symbol address to a first connection. A low pass filter is applied 658 to each filter element on short term memory (STM) node attributes. In one embodiment, filter errors are calculated as a difference between element and node attributes. Next, process 650 determines 660 if filter parameter connections are within filter temporal, spatial and order parameters. If not, it is determined 662 whether there are more connections to process. If there are no more connections, process 650 ends 664.

If the filter parameter connections are within filter temporal, spatial and order parameters, any connections to limbic class symbols are identified 666. If connections exist, new symbolic associative stimulation (SAS) nodes are created 668 for subconscious processing. If there are no connections to limbic class symbols, new symbolic associative stimulation (SAS) nodes are created 670 for hypothalamus processing. To create SAS nodes, for each node, at least one of an input symbol, an output symbol and an abstract symbol are created 672. In one embodiment, an experience type connection is defined as StimulusS which is equal to StimulusC minus ((weight−StimulusC)×Q), and an introspective type connection is defined as StimulusS which is equal to StimulusC.

Next, a latency of SAS node S is set 674. In one embodiment, LatencyS is equal to LatencyC for an introspective type connection, and as negative one for an experience type connection. Spatials of SAS node S are also set 676. In one embodiment, SpatialXYZ S is equal to SpatialXYZ C. It is then determined 662 whether there are more connections to process. If there are no more connections, process 650 ends 664, otherwise, the next connection is processed 678.

FIG. 16 is a software definition of an exemplary symbol structure 700. FIG. 17 is a software definition of an exemplary symbol base structure 710. FIG. 18 is a software definition of an exemplary symbol connection structure 720. FIG. 19 is a definition diagram 730 defining acronyms used in FIGS. 16, 17, and 18.

Figure 20:
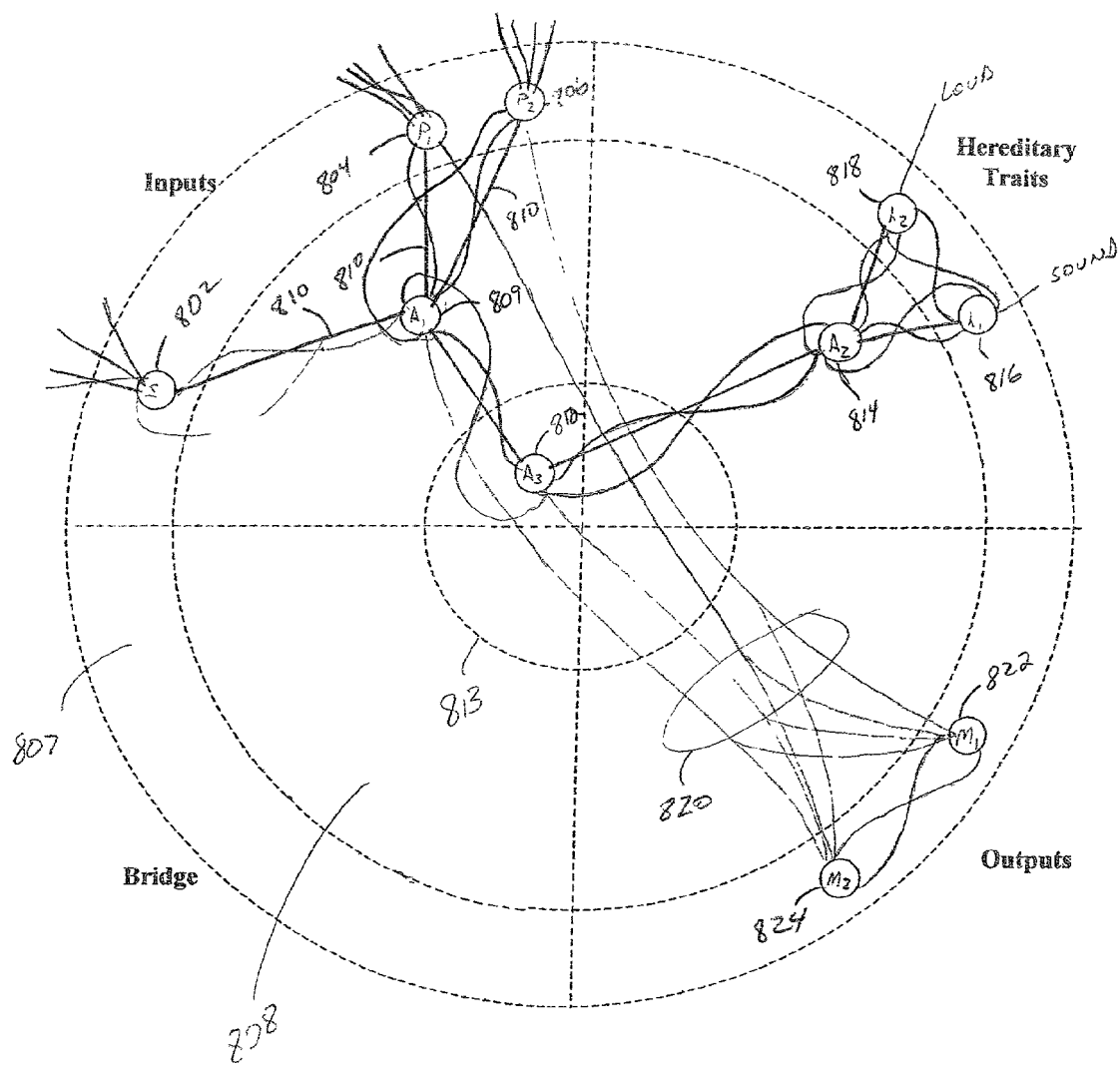
FIG. 20 is a diagram showing generation of abstracts from input symbols and hereditary traits.

Applications of COS 10 (shown in FIG. 1) are best described by an analogy to animal cognition. FIG. 20 is a diagram 800 showing generation of abstracts from input symbols and hereditary traits, the abstracts resulting in desired outputs, analogized to the teaching of a dog to sit upon command. Diagram 800 includes an auditory input 802 corresponding to hearing the command to sit. Other inputs 804, 806 correspond to pressure points a trainer applies to a dog when teaching the dog to sit. Each of inputs 802, 804 and 806 are considered to be in a cerebral processing layer 807. A Bridge 808 is a resource for allowing responses to stimulate algorithm controls, especially those dealing with the dynamic filter, thereby allowing for temporal center and boundaries to be skewed and spatial center and boundaries to be skewed (e.g. mind over-matter). Inputs 802, 804, and 806 are combined within a dog's consciousness to form a complex abstract 808 corresponding to sitting and being told to sit. Complex abstract is based upon experiences 810 generating an input image through the learning provided by the abstracts corresponding to inputs 802, 804, and 806. Experiences 810 incorporate temporal and spatial properties of inputs 802, 840 and, 806. A super abstract 812, also referred to as being within a reinforcement realm 813, incorporates all of complex abstract 808, and other abstracts, for example, actual experiences abstract 814. Abstract 814 is generated from, for example, hereditary traits, such as submission 816 and fear 818 to a loud sound, such as an assertive command (e.g. being told to sit). Symbols for abstracts and inputs are combined within consciousness to bind expectations (i.e. symbols whose introspective is excited without any actual stimulation) 820 to produce one or more outputs 822 and 824. Outputs 822 and 824 represents response, for example, two muscle groups which respond after processing the sit command and other inputs as described above. The sitting of the dog is achieved once the dog processes one or more of the inputs as being a novel grouping, triggering a learned response. In one embodiment of COS 10, inputs are processed at a 60 Hz rate.

Figure 21:
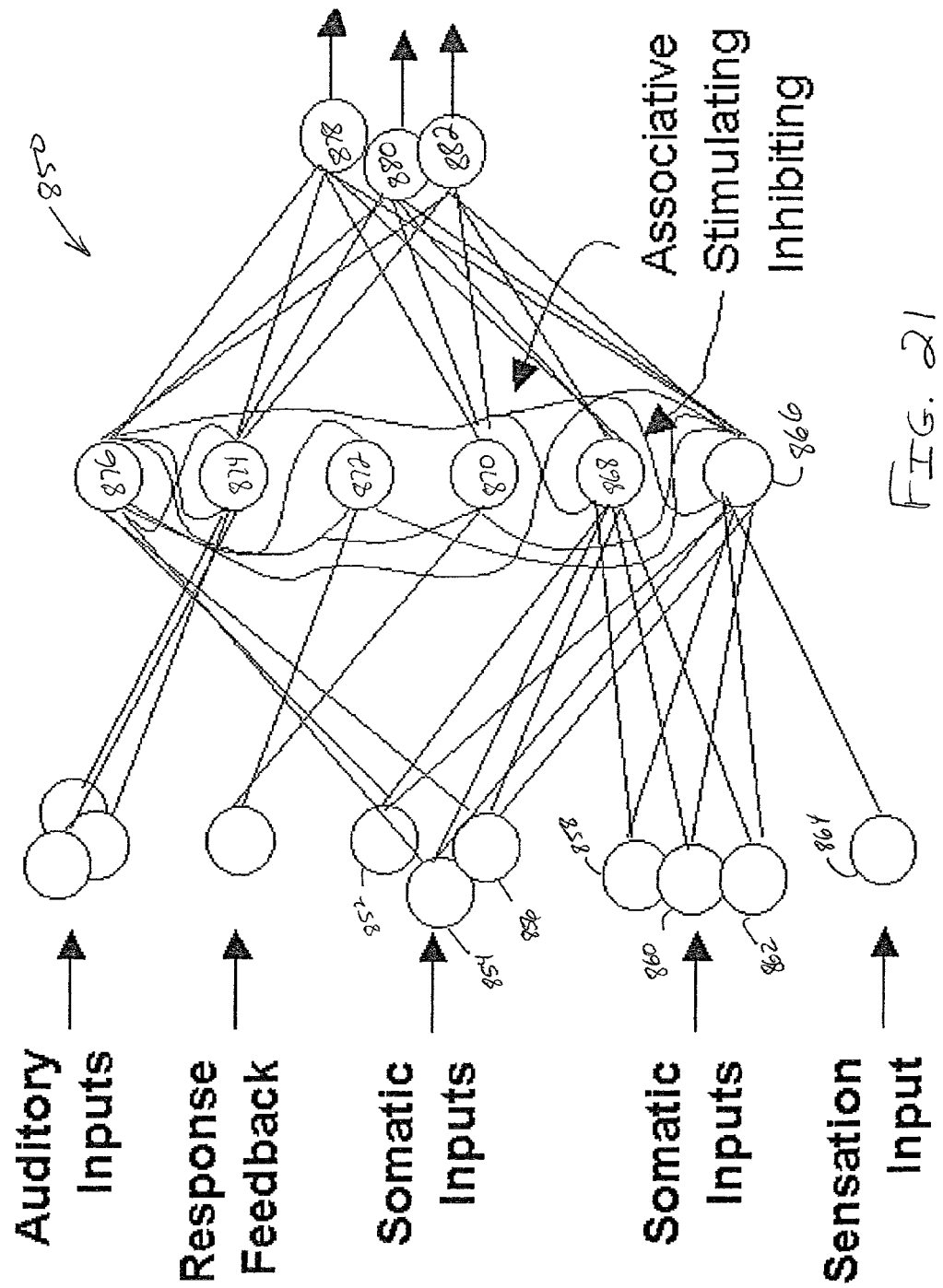
FIG. 21 is a diagram showing generation of symbols based upon novel sets of input symbols.

FIG. 21 is a diagram 850 showing generation of symbols based upon novel sets of input symbols, which is similar to diagram 800 in FIG. 20. Stimuli (not shown) are received by COS 10 and symbols are generated. Novel symbol groupings are used in creation of additional symbols. To illustrate, input symbols 852, 854, 856, 858, 860, 862, and 864 if received together for a first time, are a novel combination resulting in creation of symbol 866. Future combined receptions of input symbols 852, 854, 856, 858, 860, 862, and 864 will result in accessing of symbol 866 directly, since the combination will no longer be novel. Symbols that have been created due to other novel combinations of inputs symbols, for example, 868, 870, 872, 874, and 876 also create stimulating and inhibiting associations with one another, resulting in responses 878, 880, and 882. Resulting associations between symbols is referred to above as contiguity.

While the invention has been described in terms of various specific embodiments, those skilled in the art will recognize that the invention can be practiced with modification within the spirit and scope of the claims.

What is claimed is:

1. A computer program product comprising:
a computer usable medium having computer readable program code means embodied in said medium for storing received data images in a memory structure, the memory structure including filtering attributes of time, space, and stimulus, said computer program product executable by a computer and comprising:
a first executable portion for initializing the time, space and stimulus filtering attributes;
a second executable portion for simultaneously applying the time and space filtering attributes to the received data images and elevating the images to consciousness if the images are within dynamic temporal and spatial properties, wherein consciousness is defined as images in short term memory (STM) image space that remain active for processing in a forebrain function until the image temporal latency exceeds at least one of a temporal and a spatial focal bound when it is defined as unconscious;
a third executable portion for determining if simultaneous application of the time and space filtering attributes to the received data image has resulted in one or more filter errors, resulting in a filtered data image;
a fourth executable portion for setting a focal point attribute for the filtered data image based on a comparison of the one or more filter errors to both temporal and spatial bounds;
a fifth executable portion for storing the filtered data image and the focal point attribute in the memory structure; and
a sixth executable portion for generating a list of data images which satisfy the temporal, spatial, and stimulus attributes of the filter and defines each data image as conscious for further processing, the sixth executable portion transmitting said data images to a destination, where the destination comprises at least one of a physical output on an IO subsystem, a communications channel, and a display.

2. A computer program product encoded on a computer readable medium according to claim 1 wherein the filtering attributes include at least one of a temporal central attribute, a temporal limits attribute, a spatial position attribute, and a spatial limits attribute.

3. A computer program product encoded on a computer readable medium according to claim 2 wherein said third executable portion for determining if simultaneous application of the time and space filtering attributes to the received data image has resulted in one or more filter errors comprises an executable portion for determining differences between the received data images and the filtering attributes.

4. A computer program product encoded on a computer readable medium according to claim 3 wherein said fourth executable portion for setting a focal point attribute for the filtered data image based on a comparison of the one or more filter errors to both temporal and spatial bounds comprises an executable portion for:

determining whether temporal errors in the received data image are within a pre-stored boundary condition for the temporal limits attribute; and
determining whether spatial errors in the received data image are within a pre-stored boundary condition for the spatial limits attribute.

5. A computer program product comprising:
a computer usable medium having computer readable program code means embodied in said medium, said computer program product operable to run on a computer, said computer program product comprising:
a first executable portion for initializing a memory structure to include a symbol allocation table, one or more symbols that each comprise a plurality of data elements, and one or more data images defining a short term memory space, where the data images remain active for processing in a forebrain function until a data image temporal latency exceeds at least one of a temporal and a spatial focal bound;
a second executable portion for receiving one or more inputs each comprising one or more data elements from an external system;
a third executable portion for associating each received data element with any symbols that include a common data element;
a fourth executable portion for creating weighted interconnections between the symbols based on the common data elements, including associations between the symbols based on a temporal and spatial contiguity wherein the contiguity is driven by perspective boundaries which set the maximum temporal and spatial differences that must be met to assimilate data;
a fifth executable portion for eroding the weighted interconnections based on an amount of time that has passed since the interconnection was created thereby purging the short term memory space; and
a sixth executable portion for generating weighted connections between conscious data images permitting responses to be subsequently mapped to appropriate output signals based on a set of input signals and the weighted connections, the output signals are transmitted to a destination, where the destination comprises at least one of a physical output on an IO subsystem, a communications channel, and a display.

6. A computer program product encoded on a computer readable medium according to claim 5, wherein said computer program product further comprises an executable portion for propagating symbols updated with the received data elements into the data images.

7. A computer program product encoded on a computer readable medium according to claim 5, wherein said computer program product further comprises an executable portion for examining the data images for novel distinctions.

8. A computer program product encoded on a computer readable medium according to claim 5, wherein said third executable portion further comprises computer code for creating new symbols based on the received data elements.

9. A computer program product encoded on a computer readable medium according to claim 8, wherein said third executable portion further comprises computer code for creating groups of symbols based on the received data elements.

10. A computer program product encoded on a computer readable medium according to claim 5 wherein said data images includes at least one of a temporal attribute, a spatial attribute and a pointer reference into one or more of the symbols based on the data elements associated with each respective symbol.

11. A computer program product encoded on a computer readable medium according to claim 5 wherein said fifth executable portion comprises computer code for reinforcing a weight between interconnections based on data elements in subsequently received inputs.

12. A computer program product comprising:
a computer usable medium having computer readable program code means embodied in said medium, said computer program product operable to run on a computer, said computer program product for propagation of data elements through a system of connected symbols, each symbol including stimulus information, temporal information, spatial information, and data relating to connectivity to other symbols, said computer program product comprising:
a first executable portion for setting carrier attributes of nodes, each node indicative of a connection between at least two symbols;
a second executable portion for delaying propagation of each data element through the system of connected symbols based on one or more carrier attributes;
a third executable portion for propagating the data elements through the system by creating nodes for each connection between at least two symbols;
a fourth executable portion for setting additional node attributes based on both temporal and spatial data associated with each node;
a fifth executable portion for discarding the created nodes after the data elements have propagated through the system; and
a sixth executable portion that generates data elements that include propagation information permitting input signal data to be mapped to responses, the responses transmitted to a destination, where the destination comprises at least one of a physical output on an IO subsystem, a communications channel, and a display.

13. A computer program product encoded on a computer readable medium according to claim 12 wherein:
said third executable portion stores the created nodes as a stack in a memory of the computer; and
said fourth executable portion ensures that the data elements are retained for at least one iteration through the nodes.

14. A computer program product encoded on a computer readable medium according to claim 12 wherein said fourth executable portion comprises computer code to add spatial information associated with a node to a data element propagating through the node.

15. A computer program product encoded on a computer readable medium according to claim 12 wherein said third executable portion filters connections between data elements based on connection attributes comprising at least one of temporal elements and spatial elements.

16. A computer program product encoded on a computer readable medium according to claim 12 wherein to create a node for processing of connected data elements said computer program product comprises an executable portion creating a node for at least one of further processing of abstract connections between data elements and processing in a memory area designated for protected structures.

17. A computer program product encoded on a computer readable medium according to claim 12 wherein the data relating to connectivity to other symbols comprises at least one of an experience type connection, an introspective type connection, a latency between the connections, and a spatial error between connections.

* * * * *

UNITED STATES PATENT AND TRADEMARK OFFICE
CERTIFICATE OF CORRECTION

PATENT NO.       : 7,577,631 B2                                          Page 1 of 1
APPLICATION NO. : 10/103422
DATED            : August 18, 2009
INVENTOR(S)      : Michael J. Feldhake It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this

Seventh Day of September, 2010

David J. Kappos
*Director of the United States Patent and Trademark Office*